United States Patent
Sakabe

(10) Patent No.: US 12,443,334 B2
(45) Date of Patent: Oct. 14, 2025

(54) INFORMATION PROCESSING METHOD FOR DISPLAYING OF GRAPHICAL USER INTERFACE SCREEN USING TRAINED MODEL

(71) Applicant: MICWARE CO., LTD., Hyogo (JP)

(72) Inventor: Yoshinori Sakabe, Hyogo (JP)

(73) Assignee: MICWARE CO., LTD., Hyogo (JP)

(*) Notice: Subject to any disclaimer, the term of this patent is extended or adjusted under 35 U.S.C. 154(b) by 144 days.

(21) Appl. No.: 18/398,451

(22) Filed: Dec. 28, 2023

(65) Prior Publication Data

US 2024/0248585 A1  Jul. 25, 2024

(30) Foreign Application Priority Data

Jan. 25, 2023  (JP) .................. 2023-009209

(51) Int. Cl.
 *G06F 3/0484* (2022.01)
 *G06F 3/14* (2006.01)

(52) U.S. Cl.
 CPC .......... *G06F 3/0484* (2013.01); *G06F 3/1415* (2013.01)

(58) Field of Classification Search
 None
 See application file for complete search history.

(56) References Cited

FOREIGN PATENT DOCUMENTS

| JP | 1996-305729 A | 11/1996 |
|----|---------------|---------|
| JP | 2012-248097 A | 12/2012 |
| JP | 2015-005241 A | 1/2015 |
| JP | 2020-204847 A | 12/2020 |
| JP | 2021-015476 A | 2/2021 |
| JP | 2021-039510 A | 3/2021 |

OTHER PUBLICATIONS

Chen J, Swearngin A, Wu J, Barik T, Nichols J, Zhang X. Towards complete icon labeling in mobile applications. InProceedings of the 2022 CHI Conference on Human Factors in Computing Systems Apr. 2, 20229 (pp. 1-14). (Year: 2022).*

(Continued)

*Primary Examiner* — Zhengxi Liu
(74) *Attorney, Agent, or Firm* — Nakanishi IP Associates, LLC

(57) ABSTRACT

A program and others allow automatic generation of screen transition data for a target program as appropriate and perform prompt testing. A computer executes a target program to cause displaying of a graphical user interface (GUI) screen. The computer also detects a type of an object being operable and included in the GUI screen displayed by execution of the target program and obtains data about transition of a screen to be displayed in response to an operation on the detected object. The computer then generates screen transition data for the target program by associating the GUI screen before transition, the type of the object in the GUI screen, and the data about transition of the screen to be displayed in response to the operation on the object with one another.

11 Claims, 20 Drawing Sheets

(56) References Cited

OTHER PUBLICATIONS

Zhang X, De Greef L, Swearngin A, White S, Murray K, Yu L, Shan Q, Nichols J, Wu J, Fleizach C, Everitt A. Screen recognition: Creating accessibility metadata for mobile applications from pixels. InProceedings of the 2021 CHI Conference on Human Factors in Computing Systems May 6, 2021 (pp. 1-15). (Year: 2021).*

Zhang L, Shum HY. Statistical foundation behind machine learning and its impact on computer vision. arXiv preprint arXiv:2209.02691. Sep. 6, 2022. (Year: 2022).*

He Z, Sunkara S, Zang X, Xu Y, Liu L, Wichers N, Schubiner G, Lee R, Chen J. Actionbert: Leveraging user actions for semantic understanding of user interfaces. InProceedings of the AAAI Conference on Artificial Intelligence May 18, 2021 (vol. 35, No. 7, pp. 5931-5938). (Year: 2021).*

Li, Yuanchun, et al. "Humanoid: A deep learning-based approach to automated black-box android app testing." 2019 34th IEEE/ACM International Conference on Automated Software Engineering (ASE). IEEE, 2019. (Year: 2019).*

Moran, Kevin, et al. "Machine learning-based prototyping of graphical user interfaces for mobile apps." IEEE transactions on software engineering 46.2 (2018): 196-221. (Year: 2018).*

Office Action issued in Japanese Patent Application No. 2023-009209 dated Apr. 2, 2024 with English Translation (7 pages).

Decision to Grant Patent issued in Japanese Patent Application No. 2023-009209 mailed on Jun. 5, 2024 with English Translation (4 pages).

\* cited by examiner

| Pre-transition screen name | Object name | Operation count | Post-transition screen name |
|---|---|---|---|
| Home screen | A | 0 | |
| | B | 0 | |
| | C | 0 | |

12b

| Pre-transition screen name | Object name | Operation count | Post-transition screen name |
|---|---|---|---|
| Home screen | A | 1 | Screen A |
| | B | 0 | |
| | C | 0 | |
| Screen A | Return object | 0 | |
| | A-1 | 0 | |

12b

| Pre-transition screen name | Object name | Operation count | Post-transition screen name |
|---|---|---|---|
| Home screen | A | 1 | Screen A |
| | B | 1 | Screen B |
| | C | 1 | Screen C |
| Screen A | Return object | 1 | Home screen |
| | A-1 | 0 | |
| Screen B | Return object | 1 | Home screen |
| | B-1 | 0 | |
| | B-2 | 0 | |
| Screen C | Return object | 1 | Home screen |
| | C-1 | 0 | |

Program ID: P001

12b

| Pre-transition screen name | Object name | Layout position | Operation count | Post-transition screen name |
|---|---|---|---|---|
| Home screen | A | (Xa1,Ya1) (Xa2,Ya2) | 1 | Screen A |
| | B | (Xb1,Yb1) (Xb2,Yb2) | 1 | Screen B |
| | C | (Xc1,Yc1) (Xc2,Yc2) | 1 | Screen C |
| | | | 2 | Screen C-1 |
| Screen A | Return object | (Xr1,Yr1) (Xr2,Yr2) | 1 | Home screen |
| | A-1 | (Xa3,Ya3) (Xa4,Ya4) | 1 | Screen A-1 |
| ... | ... | ... | ... | ... |

Program ID: P001

| | Sound information | Object name | Operation count | Post-transition screen name | Sound information |
|---|---|---|---|---|---|
| Home screen | No output sound | A | 1 | Screen A | No output sound |
| | | B | 1 | Screen B | No output sound |
| | | C | 1 | Screen C | With output sound Volume** |
| | | | 2 | Screen C-1 | With output sound |
| Screen A | No output sound | Return object | 1 | Home screen | No output sound |
| | | A-1 | 1 | Screen A-1 | No output sound |
| ... | ... | ... | ... | ... | ... |

12b

| Object ID | Object name | Keyword | Processing instruction | Priority level |
|---|---|---|---|---|
| ... | ... | ... | ... | ... |
| A101 | UP (Short press) ▶▮ | AM | TUNE UP | ** |
|  |  | MUSIC | TRACK UP | ** |
| A102 | DOWN (Short press) ▮◀ | AM | TUNE DOWN | ** |
|  |  | MUSIC | TRACK DOWN | ** |
| A103 | UP (Long press) ▶▶ | AM | SEEK UP | ** |
|  |  | MUSIC | FAST UP | ** |
| A104 | DOWN (Long press) ◀◀ | AM | SEEK DOWN | ** |
|  |  | MUSIC | FAST DOWN | ** |
| ... | ... | ... | ... | ... |

[Pre-update transition diagram]

[Post-update transition diagram]

[Display of differences in post-update transition diagram]

INFORMATION PROCESSING METHOD FOR DISPLAYING OF GRAPHICAL USER INTERFACE SCREEN USING TRAINED MODEL

BACKGROUND OF INVENTION

Field of the Invention

The present invention relates to a storage medium storing a program, an information processing method, and a model generation method.

Background Art

User interfaces (UIs) including graphical user interfaces (GUIs) are used in devices in various fields. GUIs graphically display status and receive operations with physical buttons or graphically displayed buttons.

Such devices using GUIs verify the operation of software for displaying multiple screens in a transitional manner in response to input commands. The verification is typically performed in accordance with a test script generated from a test design based on the device specifications. The test script contains, for each screen, commands that can be input and post-transition screens that appear in response to the input commands. The test script is generated by capturing the post-transition screens that are expected values obtained in response to the input commands.

Such a test script is generated by manually operating buttons or icons on a screen and involves numerous workhours. Recent software is upgraded rapidly, and devices using an open source operating system (OS) are to verify the operation upon any version upgrade of the OS, although the devices have no specification change. This causes delays in verification of the developed software.

Patent Literature 1 describes a technique for generating information for verifying screen transition without human intervention. The technique described in Patent Literature 1 allows automatic generation of a screen transition diagram by extracting, from image data indicating the screen on the display of a target device, buttons included in the screen and recording screen transition data including image data before and after the screen transition performed in response to the operation on each extracted button and data about the operated buttons.

Patent Literature 2 describes a technique for improving the accuracy of automatically generated test scenarios by automatically generating test scenarios based on drawings and specifications, modifying the drawings and specifications using error information output during the scenario generation, and automatically re-generating test scenarios based on the modified drawings and specifications.

CITATION LIST

Patent Literature

Patent Literature 1: Japanese Unexamined Patent Application Publication No. 2021-15476
Patent Literature 2: Japanese Unexamined Patent Application Publication No. 2020-204847

SUMMARY OF INVENTION

Patent Literature 1 describes extracting, for example, areas surrounded by circular or rectangular frames or areas colored differently from the surrounding areas as buttons included in the screen. However, buttons may have design-oriented graphics to improve device operability, or buttons associated with the same function (processing instruction) may have different designs in different software programs. To verify various software programs, buttons displayed on the screen by execution of each software program are to be extracted accurately for generating screen transition data.

One aspect is directed to a program and others that allow automatic generation of screen transition data for a target program as appropriate and perform prompt testing.

A storage medium according to one embodiment of the present disclosure is a storage medium storing a program for causing a computer to perform operations including executing a target program to cause displaying of a graphical user interface screen, detecting a type of an object being operable and included in the graphical user interface screen displayed by execution of the target program, obtaining data about transition of a screen to be displayed in response to an operation on the detected object, and generating screen transition data for the target program by associating the graphical user interface screen before transition, the type of the object in the graphical user interface screen, and the data about transition of the screen to be displayed in response to the operation on the object with one another.

The technique according to one aspect allows automatic generation of screen transition data for a target program as appropriate and performs prompt testing.

BRIEF DESCRIPTION OF THE DRAWINGS

FIG. 12 is a diagram of a screen transition DB in the second embodiment with an example record layout.

DETAILED DESCRIPTION

A program, an information processing method, and a model generation method according to one or more embodiments of the present disclosure will now be described specifically with reference to the drawings showing the embodiments.

First Embodiment

In the present embodiment described below, an information processing device verifies the operation of a graphical user interface (GUI) program to be developed. The application program to be verified (hereafter referred to as a target program) is software for displaying multiple GUI screens in a transitional manner in response to input commands. The target program may be any program that causes displaying of GUI screens. For example, the verification target may be an application program operable on devices including displays such as personal computers, smartphones, tablets, and game consoles or devices connectable to displays.

GUI screens in the present embodiment have multiple hierarchical levels. An object (e.g., an icon or a button) in a GUI screen is operated to cause transition to a GUI screen linked to the object (a GUI screen one level lower). Each GUI screen includes a return object to return to the screen before the transition. The return object is operated to cause transition to the GUI screen as a link source (a GUI screen one level upper).

Figure 1:
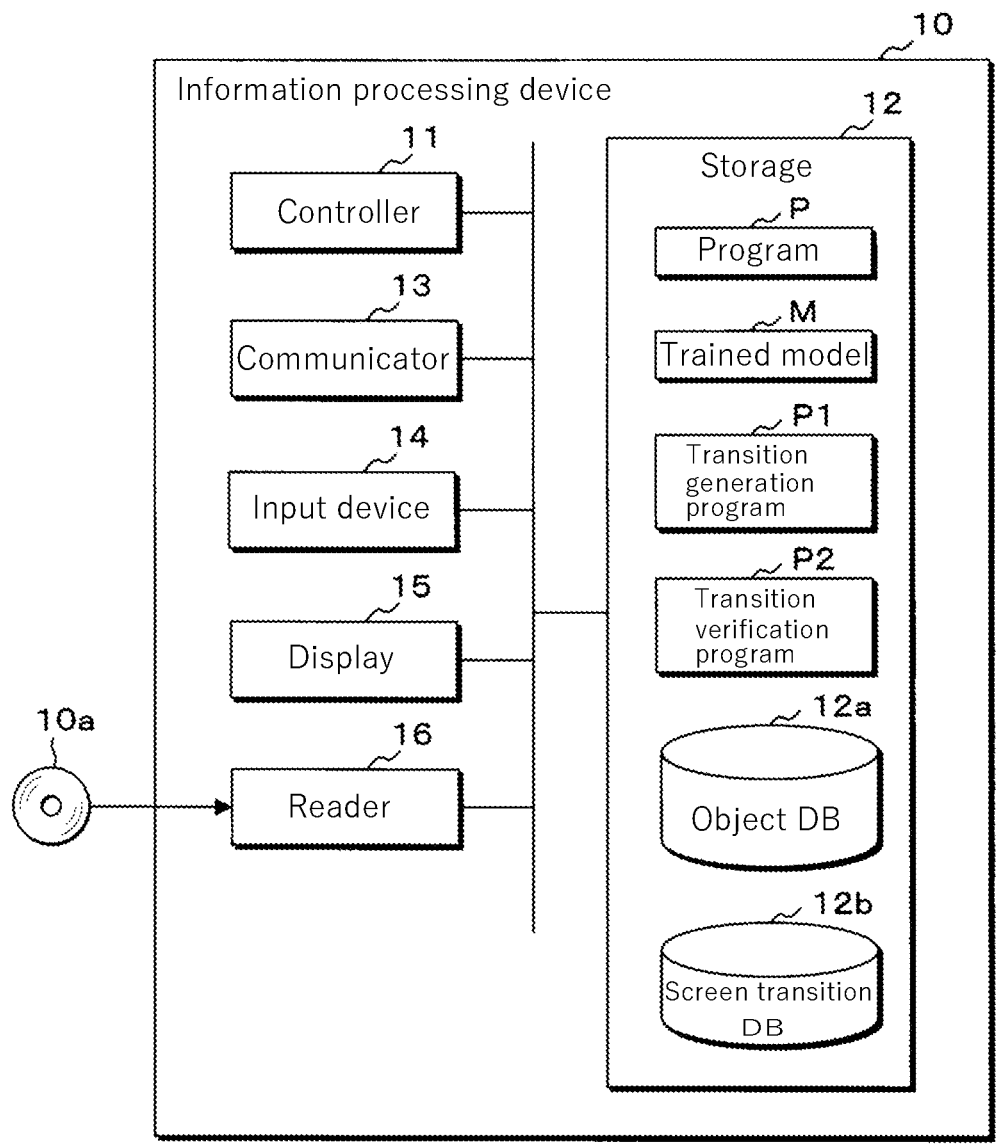
FIG. 1 is a block diagram of an information processing device with an example configuration.

FIG. 1 is a block diagram of the information processing device with an example configuration. An information processing device 10 can process various types of information and transmit and receive information. The information processing device 10 is, for example, a server computer or a personal computer.

The information processing device 10 is managed by, for example, the equipment manufacturer of a device on which an application program to be developed is installed. When the developer updates the target program, the equipment manufacturer verifies the operation of the target program with the information processing device 10.

For a device using an open source operation system (OS), the operation of the target program is verified with the information processing device 10 upon a version upgrade of the OS. The information processing device 10 may be managed and used by the developer to verify the operation of the target program.

The information processing device 10 includes, for example, a controller 11, a storage 12, a communicator 13, an input device 14, a display 15, and a reader 16, which are interconnected with a bus. The controller 11 includes one or more processors such as a central processing unit (CPU), a micro-processing unit (MPU), a graphics processing unit (GPU), or an artificial intelligence (AI) chip (a semiconductor for AI).

The controller 11 uses built-in memories such as a read-only memory (ROM) and a random-access memory (RAM) and executes a program P and other programs stored in the storage 12 as appropriate to perform various information processing operations and control processes to be performed by the information processing device 10. The controller 11 may be a single hardware piece (system-on-chip or SoC) including, for example, a processor, a memory, and a communication device in an integrated manner.

The storage 12 includes, for example, a hard disk, a slid-state drive (SSD), and a flash memory. The storage 12 stores the program P (program product) executable by the controller 11 and various types of data for execution of the program P.

The storage 12 also stores a model M trained with training data through, for example, machine learning. The model M is trained to detect operable objects included in a GUI screen in response to the GUI screen being input.

The trained model M is expected to be used as a program module included in AI software. The trained model M performs a predetermined computation on input values and outputs the computation results. The storage 12 stores, as the trained model M, data indicating, for example, the coefficients and thresholds of the functions defining the computation.

The storage 12 also stores a transition generation program P1 and a transition verification program P2. The transition generation program P1 is executable to generate, based on a target program, screen transition data (a screen transition database or DB 12b described later) to be used for operation verification of the target program. The transition verification program P2 is executable to simulate, upon an update of the target program or the execution environment of the target program, the GUI screens output by execution of the target program based on the updated target program. The transition verification program P2 is also referred to as an emulator.

The programs P, P1, and P2 stored in the storage 12 may be partially or entirely written into the storage 12 at the manufacture of the information processing device 10 or may be downloaded into the storage 12 by the controller 11 from another device through the communicator 13. The storage 12 further stores an object DB 12a and the screen transition DB 12b (described later). The trained model M, the object DB 12a, and the screen transition DB 12b may be partially or entirely stored in other storage devices connected to the information processing device 10 or in other storage devices that can communicate with the information processing device 10.

The communicator 13 is a communication module that performs processing for wired or wireless communication and transmits and receives information to and from other devices through a network. The network may be the Internet or a public telephone network, or may be a local area network (LAN) installed in the facility in which the information processing device 10 is located.

The input device 14 receives input operations performed by a user and transmits control signals corresponding to the received operations to the controller 11.

The display 15 is, for example, a liquid crystal display or an organic electroluminescent (EL) display that displays various types of information in accordance with instructions from the controller 11. Part of the input device 14 and the display 15 may be integral as a touchscreen, which may be attached to the information processing device 10 externally.

The reader 16 reads information stored in, for example, a portable storage medium 10a such as a compact disc (CD), a digital versatile disc (DVD), a universal serial bus (USB) memory, a secure digital (SD) card, a micro SD card, or CompactFlash (registered trademark). The programs P, P1, and P2 stored in the storage 12 may be partially or entirely read by the controller 11 from the portable storage medium 10*a* with the reader 16.

In the present embodiment, the information processing device 10 may be a multi-computer including multiple computers, a virtual machine built virtually by software, or a cloud server. The information processing device 10 may eliminate the input device 14 and the display 15. The information processing device 10 may receive operations through a connected computer and output information to be displayed to an external display. The programs P, P1, and P2 may be executed on a single computer or on multiple computers interconnected through a network.

Figure 2A:
FIGS. 2A and 2B are diagrams of an object DB and a screen transition DB with example record layouts.
Figure 2B:

FIGS. 2A and 2B are diagrams of the object DB 12*a* and the screen transition DB 12*b* with example record layouts. FIG. 2A shows the object DB 12*a*, and FIG. 2B shows the screen transition DB 12*b*. The object DB 12*a* is a database storing information about operable objects that may be displayed on a GUI screen.

The object DB 12*a* shown in FIG. 2A contains an object ID column, an object name column, a processing instruction column, and a priority column. The object DB 12*a* stores, in association with the object ID assigned uniquely to each object and the object name of the object, the processing instruction (e.g., a command) and the priority level assigned to the object.

In the example in FIG. 2A, a priority level of 1, 2, 3, or 4 is assigned to each object. In other examples, higher priority levels may be assigned to greater values. The priority level may not be assigned to all the objects. The graphic data for each object is stored in a predetermined area of the storage 12 (e.g., a pre-created object folder) with its object ID or object name. The object DB 12*a* may be generated for each target program. In this case, the object DB 12*a* is stored into the storage 12 in association with the program ID assigned to the target program.

The screen transition DB 12*b* is a database storing information indicating the transition states of the GUI screens to be displayed by execution of a target program. The screen transition DB 12*b* is generated by the controller 11 executing the transition generation program P1. The screen transition DB 12*b* is generated for each target program and stored into the storage 12 in association with the program ID assigned to the target program.

The screen transition DB 12*b*, generated upon verification of the target program, may be stored in the storage 12 in association with the program ID and the process ID assigned to the verification.

The screen transition DB 12*b* shown in FIG. 2B contains a pre-transition screen name column, an object name column, an operation count column, and a post-transition screen name column. The screen transition DB 12*b* stores, in association with the name of each GUI screen to be displayed by execution of a target program (pre-transition screen), the object names of the objects displayed in the GUI screen, the operation count of each object, and the name of the GUI screen that appears in response to an operation on each object (post-transition screen).

The screen data for each GUI screen is stored in a predetermined area (e.g., in a pre-generated screen DB) of the storage 12 in associated with the screen name.

As shown in the screen transition DB 12*b* in FIG. 2B, the home screen includes objects with object names A, B, and C. When object A is operated, screen A appears. When object B is operated, screen B appears.

When object C is operated on the home screen, the first operation causes screen C to appear, whereas the second operation causes screen C-1 to appear.

Screen A includes a return object and an object with the object name A-1. When the return object is operated, the home screen appears. When object A-1 is operated, screen A-1 appears.

Figure 3A:
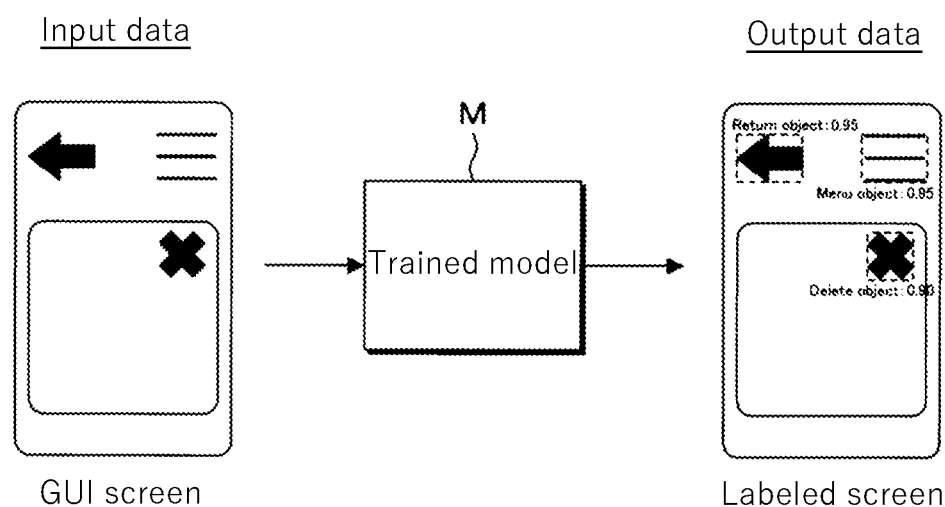
FIGS. 3A and 3B are diagrams describing a trained model.
Figure 3B:
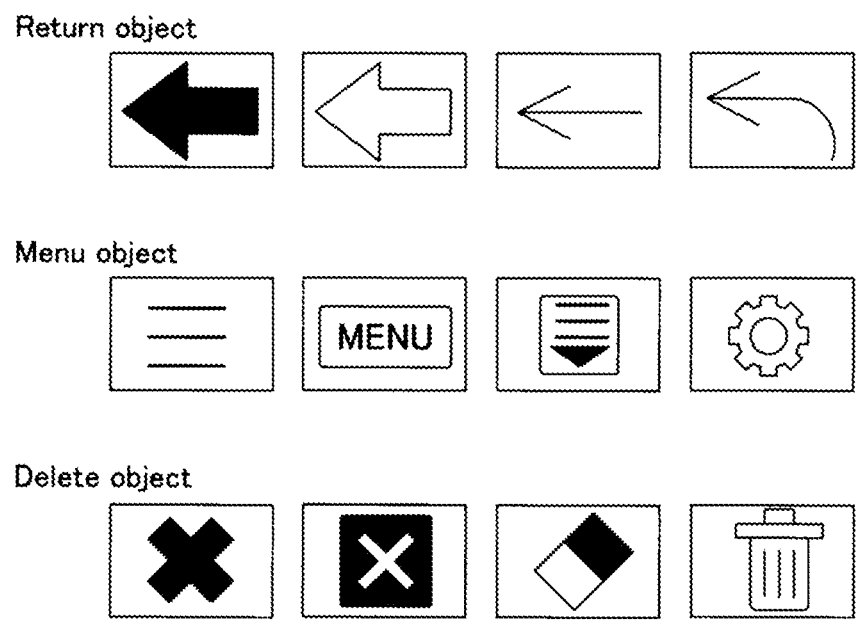

FIGS. 3A and 3B are diagrams describing the trained model M. FIG. 3A shows the trained model M with an example structure. FIG. 3B shows example training data used to train the trained model M. The trained model M is trained to receive an input screen image of a GUI screen, perform computation to recognize objects to be operated in the GUI screen based on the input GUI screen, and output the result of the recognition.

The objects to be recognized include the return objects, the menu objects, and the delete objects as shown in FIG. 3B, and home objects. These objects are pre-registered in the object folder and the object DB 12*a*. The trained model M may be a model that achieves single-label classification to recognize one type of object in the GUI screen or a model that achieves multi-label classification to recognize multiple types of objects.

The trained model M shown in FIG. 3A is a model that achieves multi-label classification. The trained model M can be generated with an object detection algorithm such as you only look once (YOLO), a region-based convolutional neural network (R-CNN), or a single shot multibox detector (SSD). The trained model M may be generated with a combination of multiple algorithms.

The trained model M may recognize objects in the input GUI screen in pixel units by semantic segmentation. In this case, the trained model M can be generated with an algorithm such as U-Net, fully convolutional network (FCN), or SegNet.

The trained model M includes an input layer to receive input GUI screens, an intermediate layer to extract features from the input GUI screens, and an output layer to output images in which objects in the GUI screens are detected based on the calculation results from the intermediate layer.

The intermediate layer calculates an output value based on the GUI screen input through the input layer using various functions and thresholds.

The output layer outputs an image (hereafter referred to as a labeled image) of the input GUI screen annotated with bounding boxes (dashed rectangles in FIG. 3A) surrounding the detected objects, classification labels indicating the types of the detected objects, and confidence scores for the classification labels.

The trained model M with this structure outputs, in response to a GUI screen being input, a labeled image (information about the object) of the GUI screen annotated with bounding boxes surrounding the objects with the names of the recognized objects and their confidence scores.

The trained model M can be generated through machine learning using training data including training GUI screens and images (true labeled images) of the GUI screens each annotated with marks (bounding boxes) surrounding the objects and object names (true labels) associated with the marks.

The training data is generated by associating, with an GUI screen, an image (true labeled image) of the GUI screen annotated by an annotator with marks (bounding boxes) surrounding the objects in the GUI screen and object names (true labels) of the objects.

The training GUI screens may be, for example, object images shown in FIG. 3B. In this case, the object images and the object names (true labels) are used as the training data. In the example shown in FIG. 3B, the objects with different graphic designs are associated with the same function (processing instruction). The training data used in the present embodiment has the same object name for the objects associated with the same function (processing instruction), although the objects have different graphic designs.

The trained model M is trained to output the true labeled image in the training data in response to a GUI screen in the training data being input. In the training, the trained model M performs computation in the intermediate layer and the output layer based on the input GUI screen and calculates the labeled image to be output from the output layer.

The trained model M compares the calculated labeled image with the true labeled image, and optimizes the parameters used in the computation in the intermediate layer and the output layer to approximate the two images to each other. More specifically, the trained model M compares the classification labels and the confidence scores for the objects detected in the calculated labeled images with the values corresponding to the true labels in the true labeled image (1 for true objects and 0 for the other objects) and optimizes the parameters to approximate the two images. The parameters include, for example, weights (coupling coefficients) between nodes in the intermediate layer and the output layer. The parameters may be optimized in any manner, and may be optimized by, for example, backpropagation or steepest descent.

The trained model M generated as described above classifies, in response to a GUI screen being input, the types of objects in the GUI screen and outputs a labeled image showing the classification results (bounding boxes, classification labels, and confidence scores).

As shown in FIG. 3B, the trained model M in the present embodiment learns to identify the objects with different graphic designs but associated with the same function (processing instruction) as the objects of the same type. The trained model M can thus identify any unlearned input graphic design as an appropriate object (similar object) from learned objects.

The information processing device 10 uses such a pre-generated trained model M described above in generating image transition data for a target program and verifying the target program. The trained model M may be trained by another training device. The model M trained and generated by another training device is downloaded into the storage 12 from the training device to the information processing device 10 through, for example, a network or the portable storage medium 10a.

Figure 4:
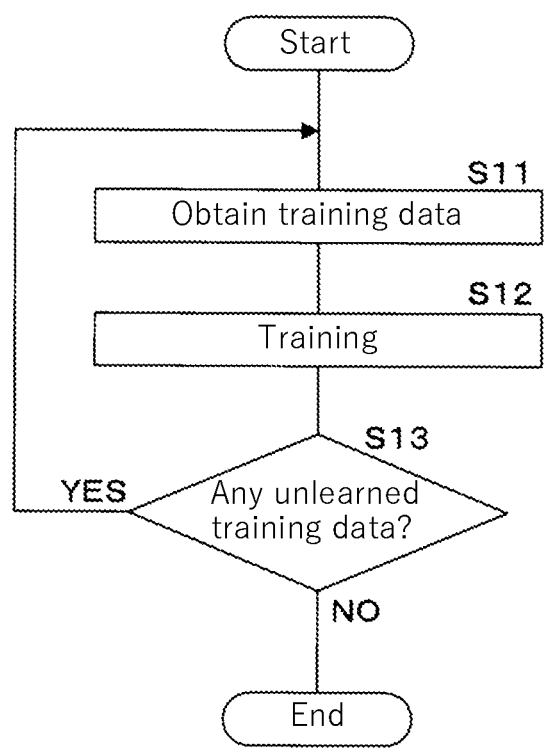
FIG. 4 is a flowchart of an example procedure for generating a trained model.

The process of generating the trained model M is described below. FIG. 4 is a flowchart of an example procedure for generating the trained model M. Each flowchart referred to in the process described below has steps denoted as S. The process described below is performed by the controller 11 in the information processing device 10 in accordance with the program P stored in the storage 12, but may be performed by other training devices. The training data described above is pre-generated and stored in a predetermined area (predetermined DB) of the storage 12.

The controller 11 obtains a piece of training data stored in the storage 12 (S11). The controller 11 then trains the model M based on the obtained training data (S12).

In this step, the controller 11 inputs the GUI screen included in the training data into the model M and obtains the output value (labeled image) output from the model M in response to the GUI screen being input. The controller 11 compares the labeled image output from the model M with the true labeled image in the training data and trains the model M to approximate the two images. In the training, the model M optimizes the parameters used for the computation in the intermediate layer and the output layer by, for example, backpropagation, which performs updates sequentially from the output layer to the input layer.

The controller 11 determines whether any unlearned piece of training data remains in the storage 12 (S13). When determining that any unlearned piece of training data remains (YES in S13), the controller 11 returns to S11 and performs processing in S11 and S12 for any unlearned piece of training data.

When determining that no unlearned piece of training data remains (NO in S13), the controller 11 ends the process. The training described above generates the trained model M that outputs, in response to a GUI screen being input, a labeled image of the GUI screen annotated with bounding boxes surrounding the objects, each with a classification label and a confidence score.

The trained model M can be re-trained through the above process to be a trained model M with higher classification accuracy.

The process performed by the information processing device 10 will now be described. The information processing device 10 in the present embodiment generates the screen transition DB 12b for a target program by executing the transition generation program P1 and verifies the screen transition state in the target program by executing the transition verification program P2.

The information processing device 10 uses, for example, the screen transition DB 12b generated based on the first released target program as the true screen transition data (with an expected value in the verification). When the target program or the execution environment for the target program is updated, the information processing device 10 generates a post-update screen transition DB 12b based on the target program and performs the verification by comparing the post-update screen transition DB 12b with a true screen transition DB 12b.

The target program used to generate the true screen transition DB 12b may be the first delivered target program, other than the first released target program.

Figure 5:
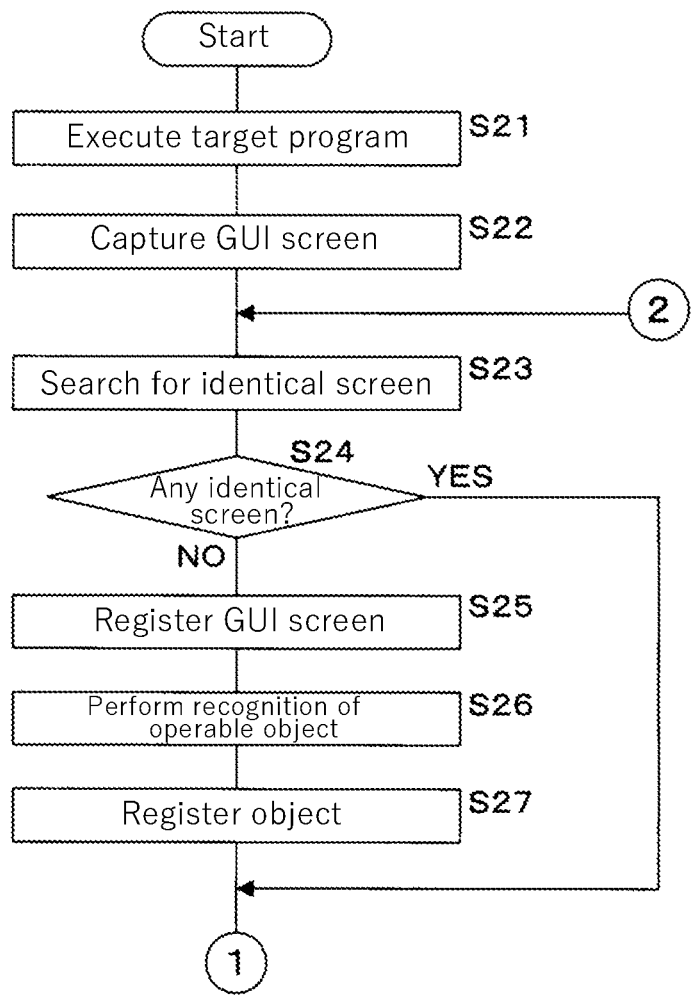
FIG. 5 is a flowchart of an example procedure for generating the screen transition DB.
Figure 6:
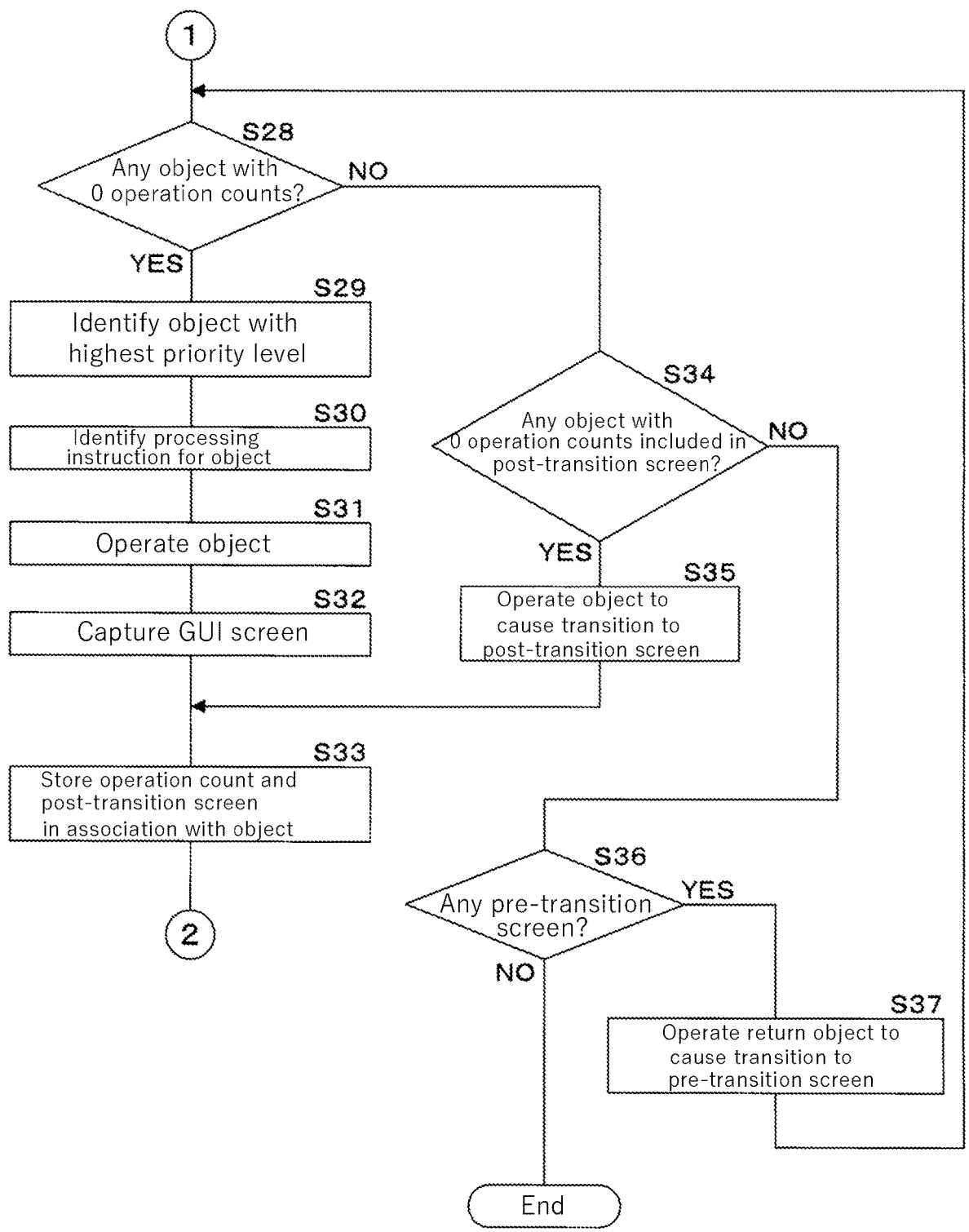
FIG. 6 is a flowchart of an example procedure for generating the screen transition DB.
Figure 7A:
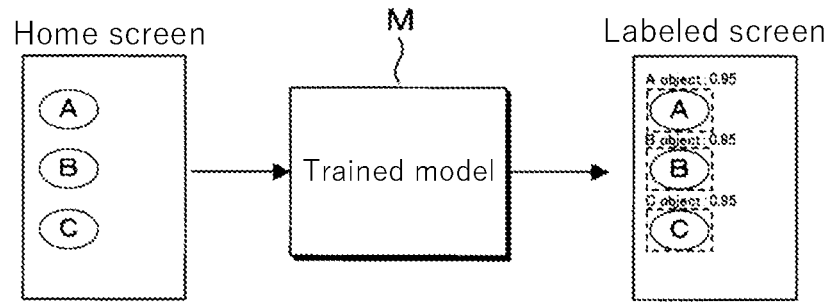
FIGS. 7A and 7B are diagrams of the screen transition DB during the generation.
Figure 7B:
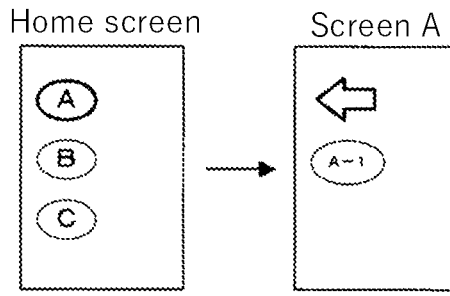
Figure 8:
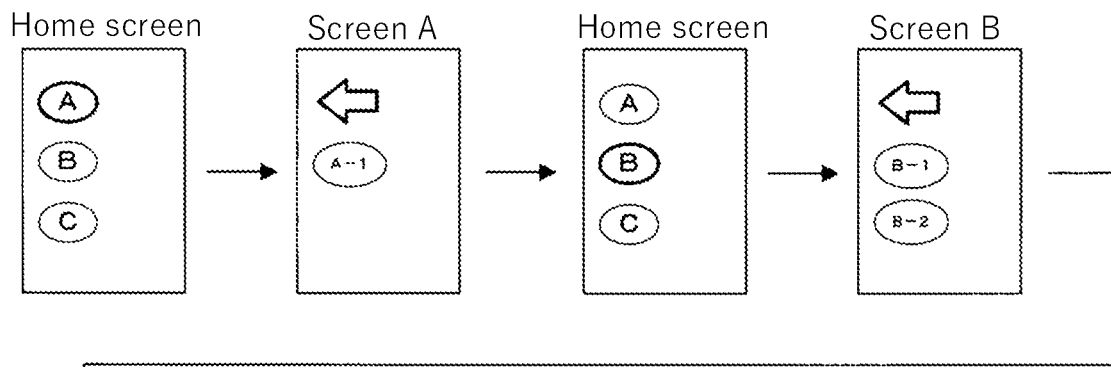
FIG. 8 is a diagram of the screen transition DB during the generation.
Figure 8:
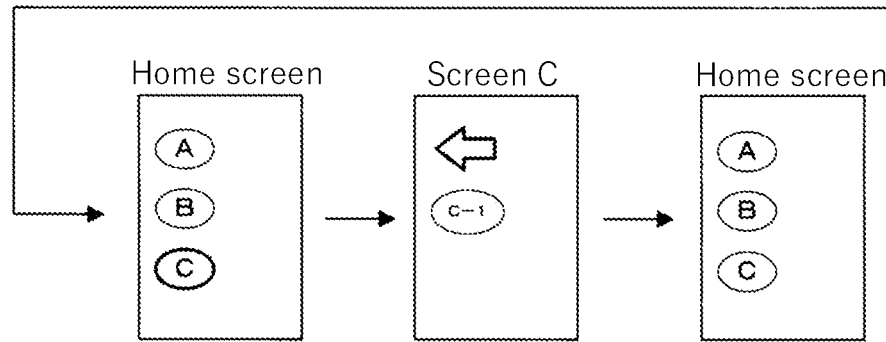

The process of generating the screen transition DB 12b for the target program will now be described. FIGS. 5 and 6 are flowcharts of an example procedure for generating the screen transition DB 12b. FIGS. 7A to 8 are diagrams of the screen transition DB 12b during the generation.

The information processing device 10 performs, after a target program developed and created by a developer is released for the first time, the process described below to generate the screen transition DB 12b storing screen transition data for the target program.

The target program is released without bugs or other faults. Such a target program is used to generate the screen transition DB 12b as the true screen transition data.

The controller 11 in the information processing device 10 activates the transition generation program P1 and executes the target program to be processed (S21) upon activation of the transition generation program P1.

The controller 11 generates a GUI screen to be displayed by execution of the target program and captures the generated GUI screen (S22).

The controller 11 captures the GUI screen to be displayed using, for example, a screen capture (screenshot) capability. The controller 11 may capture the GUI screen by causing the display 15 to display the GUI screen to be displayed by execution of the target program and obtaining an image of the GUI screen displayed on the display 15 captured with a camera.

The controller 11 searches for a screen identical to the captured GUI screen from the pre-transition screens stored in the screen transition DB 12*b* being generated (S23).

For example, the controller 11 reads, from the storage 12, the GUI screens stored as pre-transition screens in the screen transition DB 12*b* at this time point, calculates the similarity between each read GUI screen and the captured GUI screen, determines that the identical screen is stored when the maximum similarity is greater than or equal to a threshold, and specifies the GUI screen with the maximum calculated similarity as the identical screen.

The similarity may be, for example, a correlation coefficient or cosine similarity. The controller 11 may estimate the similarity between the two GUI screens using a trained model built through machine learning.

For example, the trained model may be a convolutional neural network (CNN) trained to output, in response to two GUI screens being input, the similarity between the two GUI screens. In this case, the controller 11 can input two GUI screens into the trained model and estimate the similarity between the two GUI screens based on the output information from the trained model. The threshold as a criterion for determining whether the two screens are identical may be changed as appropriate for each target program or for the verification to be performed.

After the search, the controller 11 determines whether an identical screen is stored (S24). When determining that no identical screen is stored (NO in S24), the controller 11 registers, as a pre-transition screen, the current GUI screen (the GUI screen captured in S22 in this example) into the screen transition DB 12*b* (S25).

In this step, the controller 11 assigns a screen name to the current GUI screen and stores the assigned screen name into the pre-transition screen name column of the screen transition DB 12*b*. The controller 11 also assigns a screen name to the image data of the current GUI screen and stores the assigned screen name into a predetermined area (screen DB) of the storage 12.

The controller 11 then performs recognition of an operable object in the current GUI screen (S26). More specifically, the controller 11 inputs the current GUI screen into the trained model M and obtains the labeled image output from the trained model M.

As shown in the example in FIG. 7A, when the controller 11 inputs a GUI screen including objects A, B, and C into the trained model M, the controller 11 obtains a labeled image annotated with bounding boxes indicating the objects.

In the present embodiment, the object DB 12*a* stores the processing instruction for each object. The controller 11 can thus detect the processing instruction (type) of each object as well as the name of the object in the GUI screen using the trained model M.

In addition to the image recognition using the trained model M, the controller 11 may extract text in the GUI screen using optical character recognition (OCR) to recognize objects containing predetermined text in their graphic designs. For example, for a menu object having a graphic design with the text MENU as shown in FIG. 3B, the text MENU is extracted with OCR to recognize the menu object.

The controller 11 registers each recognized object into the screen transition DB 12*b* (S27). In this step, the controller 11 stores the object name (classification label) of each recognized object into the object name column of the screen transition DB 12*b*, assigns an object name to the graphic data of each object, and stores the assigned object name into a predetermined area (object folder) of the storage 12.

FIG. 7A shows stored entries in the screen transition DB 12*b* when the name home screen is assigned to the current GUI screen and objects with object names A, B, and C are recognized in the home screen. At this time, the controller 11 stores 0 for the operation count of each object.

After the search, when determining that an identical screen is stored (YES in S24), the controller 11 skips S25 to S27 and advances to S28 with the current GUI screen already registered into the screen transition DB 12*b*.

The controller 11 refers to the screen transition DB 12*b* being generated to determine whether the current GUI screen includes any object with 0 operation counts (S28). When determining that one or more objects with 0 operation counts is included (YES in S28), the controller 11 identifies the object with the highest priority level from the objects with 0 operation counts (S29).

In this step, the controller 11 obtains the priority level set to each object with 0 operation counts from the object DB 12*a* and identifies the object with the highest priority level.

For an object with no assigned priority level, the lowest priority level may be assigned. For multiple objects in a screen each with no assigned priority level as shown in FIG. 7A, the controller 11 identifies any one object. The controller 11 may identify one object based on, for example, the display position (layout position) of each object in the screen or in alphabetical or Japanese syllabary order using the object name assigned to each object.

The controller 11 identifies the processing instruction (object type) associated with the identified object (S30). In the present embodiment, the processing instructions for the objects are stored in the object DB 12*a*. The controller 11 can thus identify the processing instruction for the identified object referring to the object DB 12*a*.

The controller 11 then operates the identified object (S31) and executes the processing instruction associated with the object. The operation on the object is a process performed with software. The controller 11 receives a command (control signal) transmitted when the identified object is operated and executes the processing instruction corresponding to the commands.

The operation is a predefined operation, such as a tap, a double-tap, or a swipe. In some embodiments, different operations may be defined for different objects. For example, operations to be performed on the respective objects may be registered in association with the respective objects. The controller 11 can execute the processing instruction corresponding to an operation (type of operation) for an object by receiving the object and the command corresponding to the operation for the object.

The controller 11 generates the GUI screen to be displayed next (post-transition GUI screen) by performing the processing instruction associated with the object (S32) and captures the generated GUI screen.

The post-transition GUI screen may be completely or partially different from the pre-transition GUI screen. The GUI screen can be captured in the same manner as in S22.

The controller 11 stores, as the post-transition screen, the GUI screen captured in S32 into the screen transition DB 12*b* in association with the pre-transition GUI screen and the object to be operated (S33). In this step, the controller 11 assigns a screen name to the captured GUI screen, stores the assigned screen name into the post-transition screen name column of the screen transition DB 12*b*, assigns a screen name to the captured GUI screen, and stores the screen name into a predetermined area (screen DB) of the storage 12.

The controller 11 updates the operation count for this object to 1. The controller 11 can thus generate screen transition data including the pre-transition GUI screen, the object in the GUI screen, and the post-transition GUI screen that appears in response to the operation on the object, and store the screen transition data into the screen transition DB 12b.

The controller 11 then advances to S23 and searches for a screen identical to the current GUI screen (in this example, the GUI screen captured in S32) (S23). When determining that no identical screen is stored (NO in S24), the controller 11 registers the current GUI screen into the screen transition DB 12b as a pre-transition screen (S25).

The controller 11 recognizes operable objects in the current GUI screen (S26) and registers the recognized objects into the screen transition DB 12b (S27). The processing up to this point causes the screen transition DB 12b to store, as shown in FIG. 7B, the screen transition data indicating, for example, that an operation on object A in the home screen causes transition to screen A including the return object and object A-1.

The controller 11 repeats the processing in S23 to S33 until the controller 11 determines that no objects in the current GUI screen has 0 operation counts. This generates, for example, the screen transition DB 12b shown in FIG. 8.

FIG. 8 shows entries in the screen transition DB 12b stored when object A in the home screen is operated to cause transition to screen A, the return object with the highest priority level in screen A is operated to cause return to the home screen, object B in the home screen is operated to cause transition to screen B, the return object with the highest priority level in screen B is operated to cause return to the home screen, object C in the home screen is operated to cause transition to screen C, and the return object with the highest priority level in screen C is operated to cause return to the home screen.

When determining that no object in the current GUI screen has 0 operation counts (NO in S28), the controller 11 determines whether the post-transition GUI screen appearing in response to an operation on any object in the current GUI screen includes any object with 0 operation counts (S34). In other words, the controller 11 determines whether the GUI screen at a lower level than the current GUI screen includes any object with 0 operation counts.

In the screen transition DB 12b shown in FIG. 8, the home screen includes no object with 0 operation counts whereas screens A, B, and C that can appear in response to an operation on the home screen include objects with 0 operation counts.

When determining that the post-transition GUI screen includes an object with 0 operation counts (YES in S34), the controller 11 operates the object for transition to the post-transition GUI screen and causes transition to the post-transition GUI screen (S35).

For example, the controller 11 operates object A in the home screen to cause transition to screen A. More specifically, the controller 11 identifies the processing instruction associated with object A, executes the processing instruction associated with object A by operating object A, and generates screen A (post-transition GUI screen) to be displayed next.

Instead of to screen A, the controller 11 may cause transition to screen B or screen C, or to a screen including many objects with 0 operation counts.

The controller 11 advances to S33 and stores the post-transition GUI screen into the screen transition DB 12b in association with the pre-transition GUI screen and the operated object (S33). In this step, the controller 11 adds a record corresponding to this object to the screen transition DB 12b, and stores, into the new record, the post-transition GUI screen and the operation counts resulting from an increment of 1 to the latest (maximum) operation count of the object.

More specifically, when the object is operated for the second time, the post-transition GUI screen is stored in association with the operation count of 2. The controller 11 then advances to S23.

When determining that the post-transition GUI screen includes no object with 0 operation counts (NO in S34), or in other words, the GUI screen at a lower level than the current GUI screen includes no object with 0 operation counts, the controller 11 determines whether the current GUI screen has a pre-transition GUI screen (a screen one level upper) (S36).

When determining that the current GUI screen has a pre-transition GUI screen (YES in S36), the controller 11 operates the return object to cause transition (return) to the pre-transition GUI screen (the screen one level upper) (S37).

In this step, the controller 11 identifies the processing instruction associated with the return object, executes the processing instruction associated with the return object by operating the return object, and generates the GUI screen to be displayed next (generates the pre-transition GUI screen).

The controller 11 then advances to S28 and determines whether the current GUI screen includes any object with 0 operation counts (S28). The controller 11 repeats the processing in S28, S34, S36, and S37 until the controller 11 determines that the current GUI screen or a GUI screen at a lower level than the current GUI screen includes any object with 0 operation counts and causes screen transition (return) to the upper level GUI screen.

When determining that the current GUI screen includes an object with 0 operation counts (YES in S28), the controller 11 advances to S29. When determining that the post-transition GUI screen includes an object with 0 operation counts (YES in S34), the controller 11 advances to S35.

When determining that the current GUI screen has no pre-transition GUI screen in S36 (NO in S36), or more specifically, when the current GUI screen is the top level GUI screen (e.g., the home screen) after the transition to the upper level GUI screen, the controller 11 ends the process. The screen transition DB 12b generated up to this point is the true screen transition data (with an expected value) to be used to verify the operation of the target program when the target program or the execution environment is updated.

In the process described above, each object in the GUI screen is operated at least once to generate the screen transition DB 12b. In another example, each object in the GUI screen may be operated at least twice to generate the screen transition DB 12b. In this case, in S28, the controller 11 determines whether any object in the current GUI screen has an operation count of less than 2.

The process in the present embodiment described above allows automatic generation of the screen transition DB 12b (image transition data or a test scripts indicating screen transition states) by actually operating the target program. The screen transition DB 12b generated for the first time for the target program, or for example, the screen transition DB 12b generated based on the first released target program, is used as the ground truth (expected value) in the operation verification of the target program to be updated subsequently. Thus, the operation verification can be performed without generating the screen transition DB 12b (test script) based on device specifications.

When the screen transition DB 12b is generated for the first time for the target program, the person in charge of the verification examines the screen transition DB 12b to determine whether the registered screen transition data for each screen is correct and corrects any incorrect screen transition data as appropriate. After this process, the screen transition DB 12b can be used as the ground truth for the operation verification.

The verification using the screen transition DB 12b (hereafter referred to as the true screen transition DB 12b) generated for the first time based on a target program through the above process will now be described.

When the target program with the true screen transition DB 12b generated is updated or when the execution environment (e.g., the OS) of the target program is updated, the information processing device 10 re-executes the transition generation program P1 to generate a post-update screen transition DB 12b after the update. The information processing device 10 compares the generated updated screen transition DB 12b with the true screen transition DB 12b and indicates the location with any difference as an error location.

Figure 9:
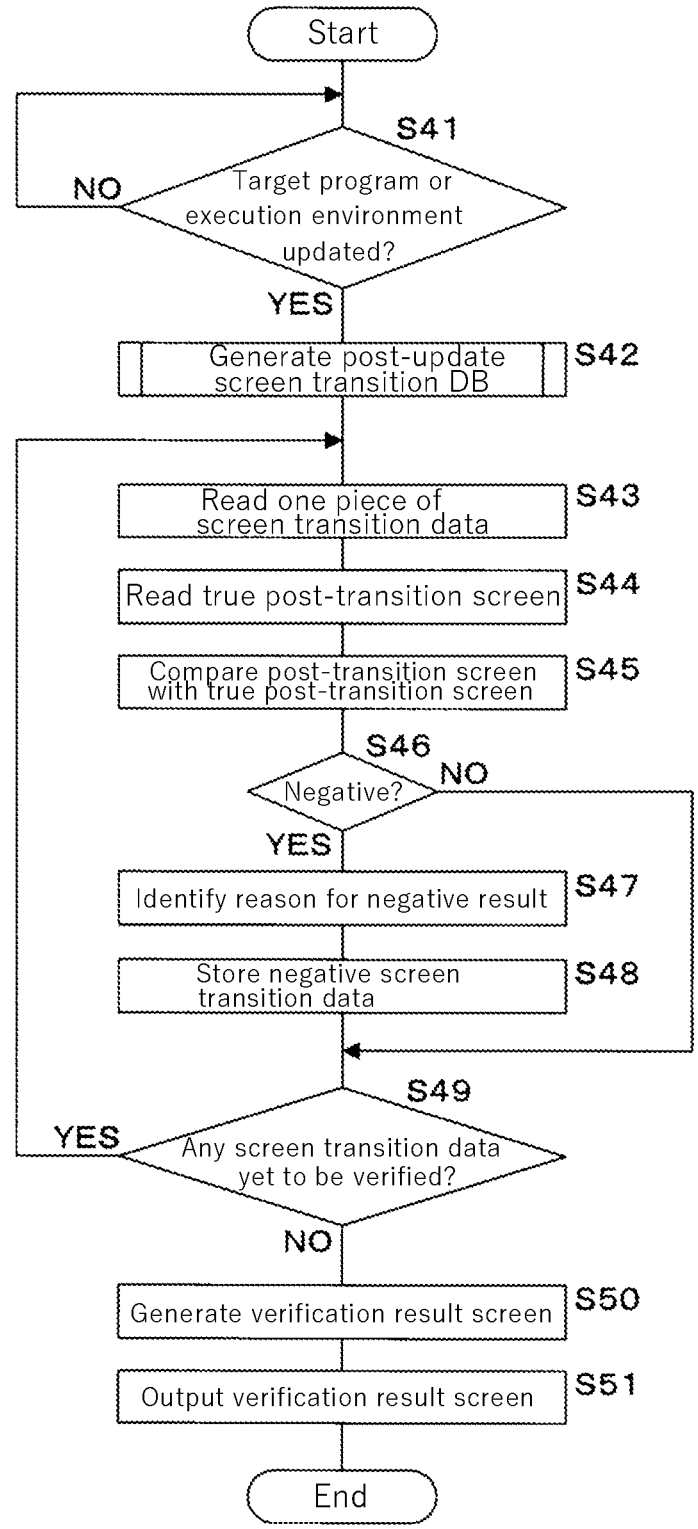
FIG. 9 is a flowchart of an example verification procedure for a target program.
Figure 10A:
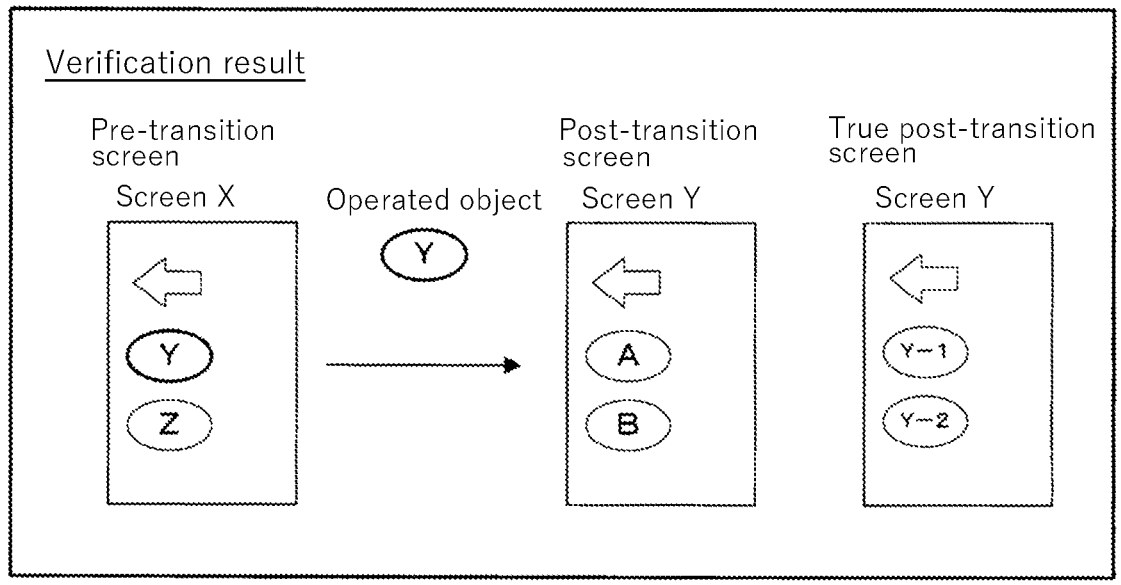
FIGS. 10A and 10B are diagrams of example screens.
Figure 10B:
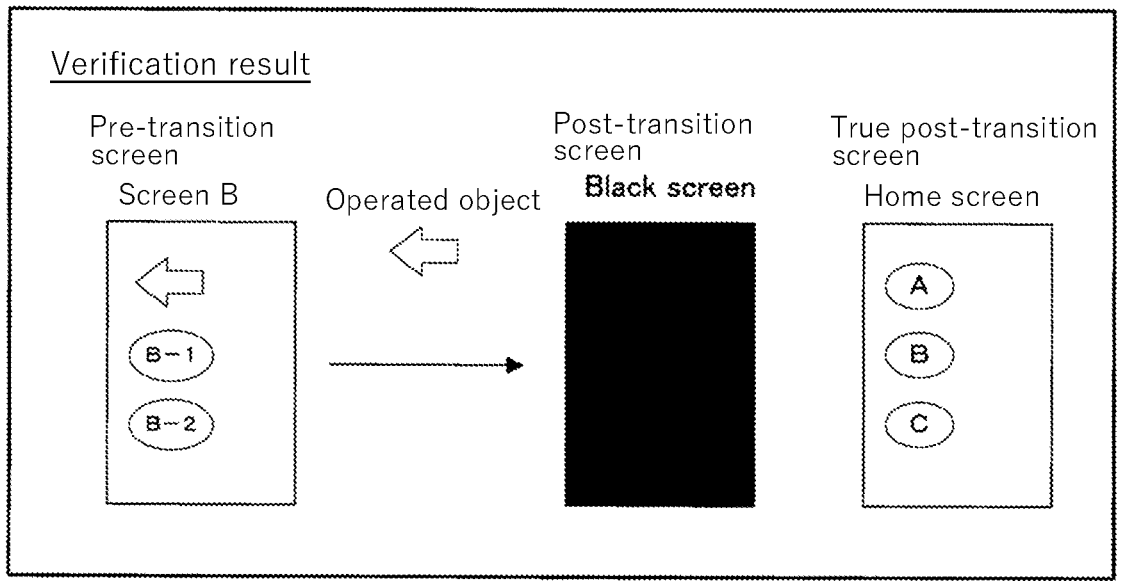

FIG. 9 is a flowchart showing an example verification procedure for a target program. FIGS. 10A and 10B are diagrams of example screens. The controller 11 in the information processing device 10 performs the verification described below when the target program with the true screen transition DB 12b generated through the process shown in FIGS. 5 and 6 is updated or the execution environment (e.g., the OS) of the target program is updated.

The controller 11 in the information processing device 10 determines whether either the target program or the execution environment of the target program has been updated (S41). The target program is determined to be updated when, for example, the target program updated by the developer is delivered and stored into a predetermined area (e.g., a pre-generated folder) of the storage 12.

The updates to the target program include automatic upgrading in addition to upgrading performed by the developer.

The execution environment is determined to be updated when, for example, the execution environment (e.g., the OS) of the device incorporating the target program is upgraded.

The update status of the target program and the execution environment may be received through the input device 14 or the communicator 13. When determining that none of the target program nor the execution environment has been updated (NO in S41), the controller 11 waits until one of them is updated.

When determining either the target program or the execution environment has been updated (YES in S41), the controller 11 generates a screen transition DB 12b for the updated target program (S42).

The processing in S42 is the process of generating the screen transition DB 12b shown in FIGS. 5 and 6. The controller 11 activates the transition generation program P1 and executes the target program to be processed upon activation of the transition generation program P1. This generates a post-update screen transition DB 12b in which screen transition data is accumulated.

The controller 11 then compares the pre-generated true screen transition DB 12b with the post-update screen transition DB 12b generated in S42 and performs operation verification on the screen transition data in the post-update screen transition DB 12b to determine whether any error has occurred.

More specifically, the controller 11 reads one piece of screen transition data from the post-update screen transition DB 12b (S43). In this step, the controller 11 reads, as the screen transition data, the pre-transition screen name, the object name, the operation count, and the post-transition screen name stored in one record of the post-update screen transition DB 12b.

The controller 11 then reads the true post-transition screen corresponding to the pre-transition screen name, the object name, and the operation count in the read screen transition data (S44). In this step, the controller 11 reads the post-transition screen name (true post-transition screen name) stored in the true screen transition DB 12b in association with the pre-transition screen name, the object name, and the operation count in the read screen transition data. The controller 11 reads, based on the read true post-transition screen name, the post-transition screen (true post-transition GUI screen) stored in the screen DB.

The controller 11 reads the post-transition screen (post-transition GUI screen) stored in the screen DB based on the post-transition screen name included in the screen transition data read in S43, and compares the read post-transition GUI screen with the true post-transition GUI screen read in S44 (S45).

In this step, the controller 11 calculates the similarity (degree of similarity) between the two GUI screens to be compared. When the similarity is greater than or equal to a threshold, the post-transition GUI screen is determined to be the true screen (verification result being positive). When the similarity is less than the threshold (less than a predetermined value), the post-transition GUI screen is determined to be an untrue screen (verification result being negative).

The similarity may be estimated using, for example, a correlation coefficient or cosine similarity, or using a trained model built through machine learning. The threshold as a criterion for determining whether the verification result is positive or negative based on the comparison of the two screens may be changeable as appropriate for, for example, the verification to be performed.

For example, during the verification, a post-transition GUI screen can be entirely white, entirely black, or entirely blue. In such states, the post-transition GUI screen has a low degree of similarity to the true GUI screen.

For verification performed to detect such a state as a negative verification result, the threshold is to be set to a low value. For verification performed to detect any small difference from the true GUI screen as a negative verification result, the threshold is set to be a high value, with the degree of similarity to the true GUI screen being high.

The controller 11 determines whether the verification result from the comparison of the post-transition GUI screen included in the screen transition data read in S43 with the true post-transition GUI screen is negative (S46). When determining that the result is negative (YES in S46), the controller 11 identifies the reason for the negative verification result (S47).

The reason for the negative verification result includes, in addition to the white screen state, the black screen state, and the blue screen state, freezing in which objects in the screen stop responding and a text protruding (abnormal text) state in which the text in the screen protrudes from an appropriate area. The controller 11 thus determines whether the entire post-transition GUI screen is white, black, or blue. When determining that the screen is entirely in one of the colors, the controller 11 identifies the white screen, the black screen, or the blue screen as the reason for the negative verification result.

When an operation on an object in the post-transitioned GUI screen is repeated (retried) by a predetermined number of times or for a predetermined period to switch to the next GUI screen but the screen remains unswitched and the retry is unaccepted, the controller 11 identifies the freezing state as the reason for the negative verification result. In the post-transition GUI screen, the controller 11 determines whether the background of a text string in the screen is multi-colored. When determining that the background is multi-colored, the controller 11 identifies the text protruding state in which the text protrudes from the text area as the reason for the negative verification result.

Typically, a text string is displayed on the same background. A multi-colored background of a text string can thus be identified as the text protruding state in which the text string protrudes from the text area.

The controller 11 may read the text in the post-transition GUI screen using OCR and identify the text protruding state when any text of a word or a term unregistered in a pre-created dictionary is contained. The controller 11 may use a trained model built through machine learning to estimate the reason for a negative verification result.

For example, the trained model may be a CNN trained to output information indicating whether an input post-transition GUI screen is in, for example, the white screen state, the black screen state, the blue screen state, the freezing state, or the text protruding state. In this case, the controller 11 inputs the post-transition GUI screen into the trained model and estimates, based on the output information from the trained model, whether the verification result for the post-transition GUI screen is negative and the reason for any negative verification result.

The controller 11 stores the screen transition data determined to be negative in the verification result into a predetermined area (e.g., a pre-generated verification result DB) of the storage 12 (S48). In this step, the controller 11 stores the reason for the negative verification result in association with the pre-transition screen name, the object name, the operation count, and the post-transition screen name included in the screen transition data.

The controller 11 may also store the true post-transition GUI screen for this screen transition data in association with the screen transition data and the reason for the negative result. When determining that the verification result is not negative (NO in S46), the controller 11 skips S47 and S48.

The controller 11 determines whether any piece of screen transition data stored in the post-update screen transition DB 12*b* generated in S42 has yet to be verified as described above (S49).

When determining that the post-update screen transition DB 12*b* contains any piece of data yet to be verified (YES in S49), the controller 11 returns to S43 and performs the processing in S43 to S48 on any piece of screen transition data yet to be verified. When determining that the post-update screen transition DB 12*b* contains no piece of data yet to be verified (NO in S49), the controller 11 ends the verification process and generates a verification result screen based on the verification results accumulated in the verification result DB (S50).

FIGS. 10A and 10B show example verification result screens. The screens shown in FIG. 10A display screen transition data with the verification result being negative. When object Y in pre-transition screen X is operated, post-transition screen Y is different from true screen Y When the verification result DB stores true post-transition GUI screens, the true post-transition GUI screen can be displayed as in FIG. 10A in addition to the screen transition data with the negative verification result. The screens shown in FIG. 10B display screen transition data with the verification result being negative. When the return object in pre-transition screen B is operated, the post-transition GUI screen is entirely black.

The controller 11 outputs the generated verification result screen (S51) and ends the process. The controller 11 may store the verification result screen into the storage 12, output the verification result screen to the display 15 for display, or transmit the verification result screen to a specified device through the communicator 13. The controller 11 may also transmit, through the communicator 13, the verification result screen to a printer that can communicate with the information processing device 10 to print the screen. The verification results can thus be provided with any method.

The person in charge of the verification examines, on the verification result screen, the screen transition data with a negative verification result and determines whether the screen transition data different from the true screen transition data results from a bug or other errors or from the specification change in the updated target program. The person then acts as appropriate for the determination result.

The verification in the present embodiment described above allows automatic generation of the post-update screen transition DB 12*b* upon an update of the target program or the execution environment of the target program. The verification also allows automatic verification as to whether each piece of screen transition data stored in the post-update screen transition DB 12*b* indicates appropriate screen transition based on the comparison with the pre-generated true screen transition DB 12*b* (test script). Thus, for a target program or an execution environment that is frequently improved or upgraded, the post-update screen transition DB 12*b* is generated automatically and the verification is performed automatically upon every update of the target program or the execution environment. The person in charge of the verification can simply examine the verification result screen to reduce an increased workload in the verification.

The screen transition DB 12*b* in the present embodiment is generated with a priority level set to each object in the GUI screen. The objects are operated in order of priority from the object with the highest priority level to generate the screen transition data and store the screen transition data into the screen transition DB 12*b*.

For example, when a higher priority level is set to the return object, as shown in FIG. 8, each object A, B, or C in the home screen is operated to cause transition to screen A, B, or C. The return object can then be operated in each screen A, B, or C to cause return to the home screen. In other words, the screen transition data indicating the transition from the home screen to screens A, B, and C at one level lower and the screen transition data indicating the transition from each screen A, B, or C to the home screen are generated with priority, followed by generation of the screen transition data indicating the transition from screen A (or B or C) to screen A-1 (or B-1 or C-1) at further one level lower and the screen transition data indicating the transition from screen A-1 (or B-1 or C-1) to screen A (or B or C). This process allows, in the hierarchical GUI screens, collection of screen transition data indicating transition to each GUI screen at the same depth of hierarchy for each depth in order from the upper level of hierarchy.

This process may be performed when, for example, many locations are to be improved or upgraded or when the quality of the target program is poor. The process allows wide range verification of screen transitions resulting from execution of the target program for each depth of hierarchy in order from the upper level of hierarchy, with efficient generation of screen transition data.

When a lower priority level is set to the return object, in the home screen shown in FIG. 8, one object (e.g., object A) is operated to cause transition to screen A, and then an object (e.g., object A-1) other than the return object is operated on screen A to cause transition to screen A-1 at a further lower level. In other words, after the screen transition data indicating the transition from the home screen to screen A at one level lower is generated, the screen transition data indicating the transition from screen A to screen A-1 at further one level lower is generated.

This process allows, in the hierarchical GUI screens, collection of screen transition data indicating sequential transitions of each GUI screen in the depth direction resulting from an operation on one object in the home screen. This process may be performed when, for example, the quality of the target program is stable. The process allows intensive verification of screen transitions in the depth direction from a GUI screen to a lower level GUI screen. This allows efficient collection of screen transition data for locations at which bugs are likely to occur, locations at which particular functions are achieved, or locations intended to be verified intensively.

As described above, each object is set with an appropriate priority level to allow switching between generating, with priority, screen transition data indicating transition to each GUI screen for each level of the hierarchy (at the same depth) in order from the GUI screen at an upper level and generating, with priority, screen transition data indicating transition in the depth direction of the GUI screen hierarchy.

As described above, the generation of screen transition data indicating transition to each GUI screen for each hierarchy level at the same depth allows transition to each GUI screen for each hierarchy level, and the generation of screen transition data indicating transition to each GUI screen sequentially in the depth direction of the hierarchy allows transition in the depth direction of the hierarchy. This reduces omission of GUI screens from generation targets of screen transition data and allows generation of highly accurate screen transition data.

When, for example, screen transition data indicating the transition to each GUI screen is generated through random operations on objects in the GUI screen, the objects can be operated in a biased manner, possibly with some objects unoperated. In this case, some GUI screens can be omitted from the screen transition data generation targets, possibly reducing the accuracy of screen transition data. The priority for each object may be set manually by the person in charge of the verification or automatically in accordance with predetermined rules.

In the present embodiment, the objects in GUI screens are recognized by image recognition using the trained model M. This allows any unlearned graphic design object to be classified as any of learned objects. For example, an unlearned object is classified as an object with a similar graphic design.

The object recognition may be performed by, for example, rule-based image recognition. For example, the objects in the GUI screen may be identified by pattern matching using template images that are pre-generated from the images (graphic designs) of the objects.

In the embodiment described above, the GUI program to be processed is installed in a device. In some embodiments, the GUI program may be an application program for general-purpose personal computers or a web application.

In the present embodiment, the generation of the screen transition DB 12*b* with the transition generation program P1 and the verification with the transition verification program P2 are not limited to be performed locally by the information processing device 10. For example, a server may generate the screen transition DB 12*b*.

In this case, the information processing device 10 transmits a target program for which the screen transition DB 12*b* is to be generated to the server, which then generates the screen transition DB 12*b* for the target program by activating the transition generation program P1 and transmits the generated screen transition DB 12*b* to the information processing device 10. In this case, the information processing device 10 can obtain the true screen transition DB 12*b* and the post-update screen transition DB 12*b* generated by the server and perform the verification with the transition verification program P2 using the two obtained screen transition DBs 12*b*.

A server may perform the verification. In this case, the information processing device 10 transmits the true screen transition DB 12*b* and the post-update screen transition DB 12*b* to the server, which then performs the verification by comparing the two screen transition DBs 12*b* to generate a verification result screen and transmits the screen to the information processing device 10. In this case, the information processing device 10 can obtain the verification result screen generated by the server and cause, for example, the display 15 to display the screen. Such structures can also perform the same process as in the present embodiment and produces the same effect.

Second Embodiment

In the first embodiment described above, the processing instructions associated with the objects detected in the GUI screen are registered in the object DB 12*a*. However, in some execution environments of the target program, the processing instructions associated with objects may be unpublished. In this case, the processing instructions associated with the detected objects cannot be executed. The GUI screen (post-transition GUI screen) to be displayed in response to an operation on an object cannot be generated.

In the present embodiment, the target program is actually executed to cause the display 15 to display the GUI screen to be displayed. The objects in the displayed GUI screen are detected, and the detected objects are actually operated by a robotic arm to achieve screen transition to the GUI screen to be displayed in response to an operation on the object. An information processing device that generates screen transition data through this process will be described.

Figure 11:
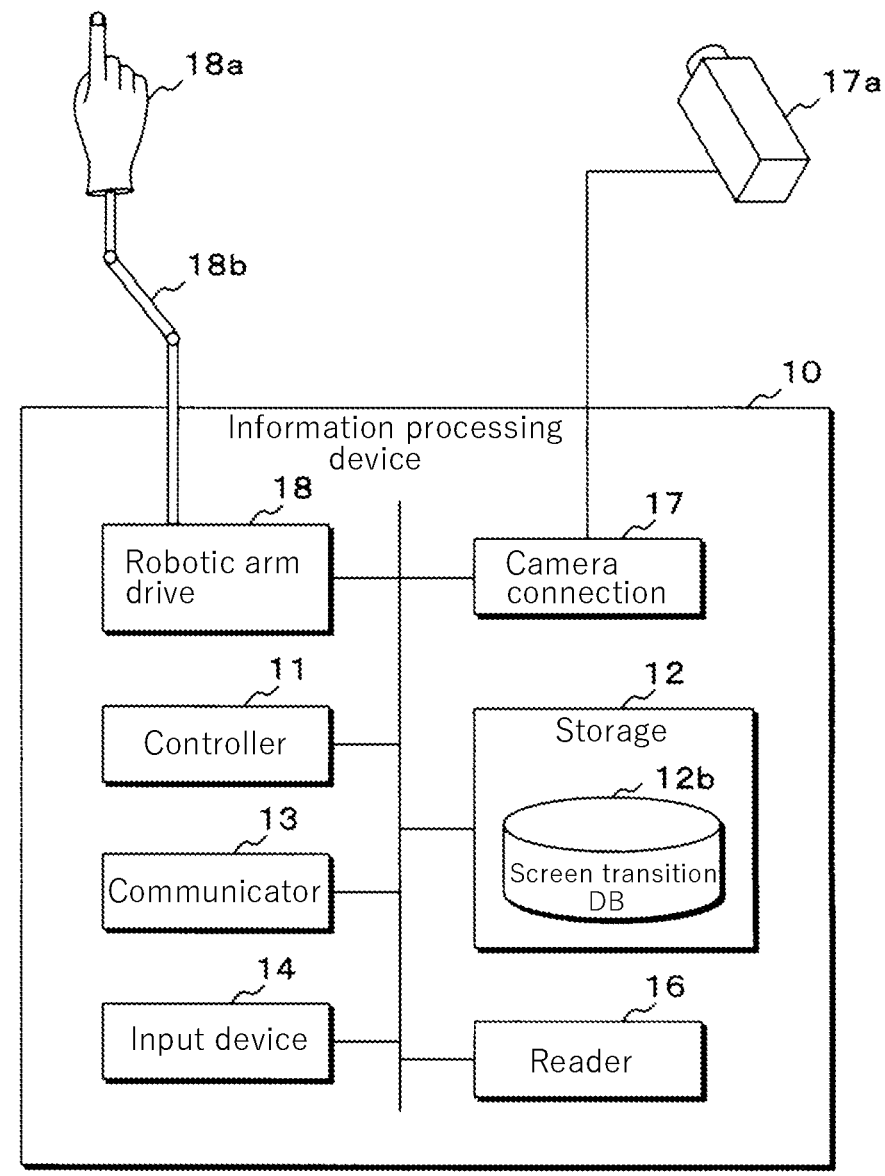
FIG. 11 is a block diagram of an information processing device according to a second embodiment with an example configuration.

FIG. 11 is a block diagram of an information processing device according to a second embodiment with an example configuration. An information processing device 10 in the present embodiment includes a camera connection 17 and a robotic arm drive 18, in addition to the components of the information processing device 10 in the first embodiment shown in FIG. 1.

The same components as in the first embodiment are not described. In the information processing device 10 in the present embodiment, the display 15 includes a capturing display 15*a* and an operation display 15*b*. The operation display 15*b* includes a touchscreen.

The camera connection 17 is connected to a camera 17*a* with, for example, a cable. The camera 17*a* obtains image data, such as still images or video, and outputs the obtained image data to the information processing device 10. The camera connection 17 obtains the image data output from the camera 17a.

The controller 11 in the information processing device 10 obtains the image data output from the camera 17a through the camera connection 17 and stores the data into the storage 12. The camera connection 17 may communicate with the camera 17a wirelessly.

The robotic arm drive 18 is connected to a robotic arm 18b, which has a finger part 18a at its distal end to operate the touchscreen.

The robotic arm drive 18 drives the robotic arm 18b as instructed by the controller 11. The robotic arm drive 18 moves the finger part 18a to a position on the operation display 15b and allows the finger part 18a to perform an operation at the position. The operation performed by the finger part 18a includes, for example, a tap, a double-tap, and a swipe.

To generate the screen transition DB 12b, the information processing device 10 in the present embodiment with the above structure sequentially displays GUI screens to be displayed by execution of the target program on the capturing display 15a and the operation display 15b. The information processing device 10 detects objects in the GUI screens by capturing the GUI screens on the capturing display 15a with the camera 17a.

The information processing device 10 allows the finger part 18a to operate the display screen on the operation display 15b by causing the robotic arm drive 18 to drive the robotic arm 18b on the GUI screen on the operation display 15b.

FIG. 12 is a diagram of a screen transition DB 12b according to the second embodiment with an example record layout. The screen transition DB 12b in the present embodiment includes a layout position column in addition to the columns in the screen transition DB 12b in the first embodiment shown in FIG. 2B. The layout position column stores information indicating the layout positions of the objects in the pre-transition GUI screen.

The layout position of an object is represented by the coordinates of the upper left pixel and the lower right pixel in the display area (e.g., the rectangular area) of the object in the coordinate system with, for example, the origin at the upper left of the display area of the GUI screen displayed on the display 15 (the capturing display 15a and the operation display 15b), X-axis extending rightward from the origin, and Y-axis extending downward from the origin.

Figure 13:
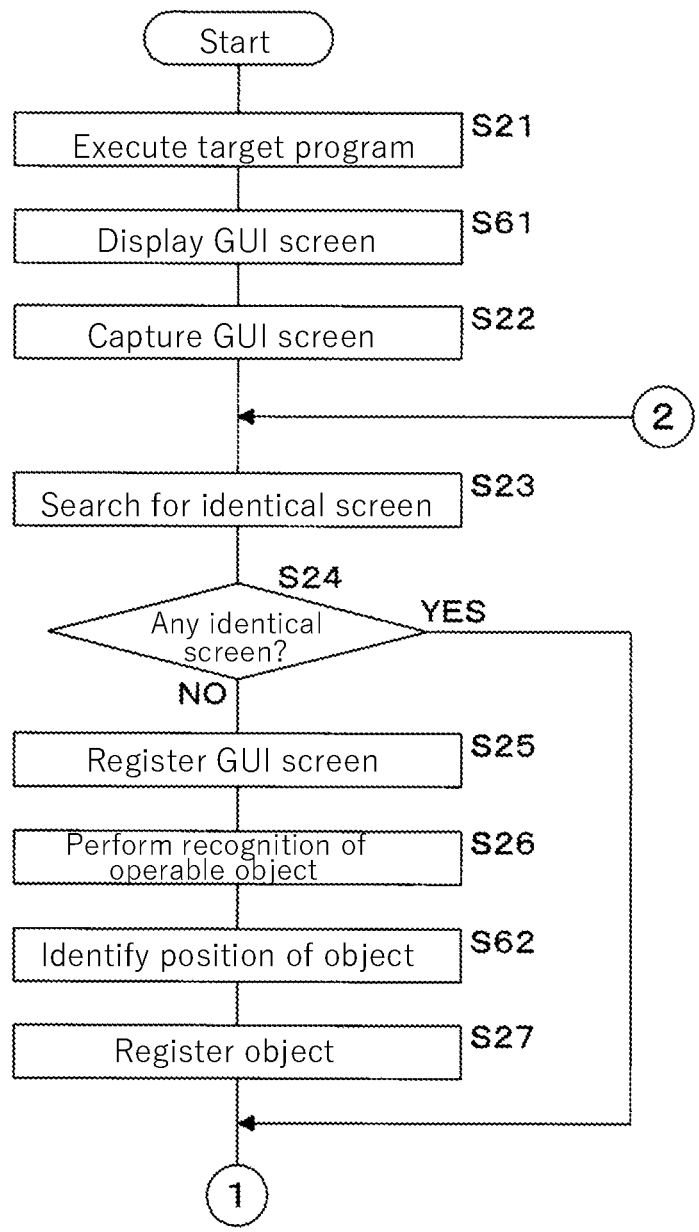
FIG. 13 is a flowchart of an example procedure for generating the screen transition DB in the second embodiment.
Figure 14:
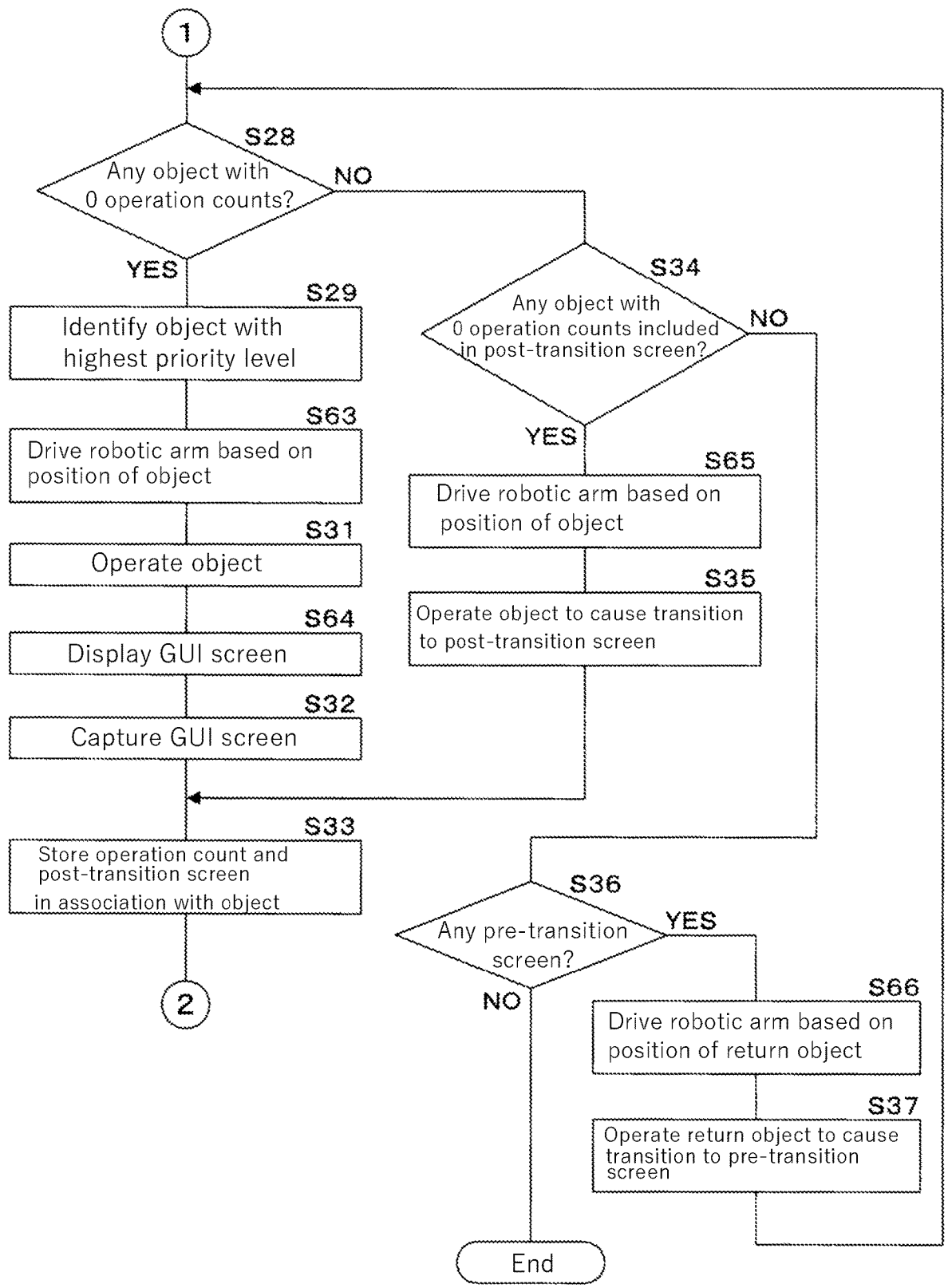
FIG. 14 is a flowchart of an example procedure for generating the screen transition DB in the second embodiment.

FIGS. 13 and 14 are each a flowchart of an example procedure for generating the screen transition DB 12b in the second embodiment. The process shown in FIGS. 13 and 14 is modified from the process shown in FIGS. 5 and 6, with S61 added between S21 and S22, S62 added between S26 and S27, S63 replacing S30, S64 added between S31 and S32, S65 added between YES in S34 and S35, and S66 added between YES in S36 and S37. The same process as in FIGS. 5 and 6 is not described.

In the information processing device 10 in the present embodiment, the controller 11 executes the target program (S21) upon activation of the transition generation program P1, and causes the displays 15a and 15b to display the GUI screen to be displayed by execution of the target program (S61).

The controller 11 captures the GUI screen displayed on the capturing display 15a by photographing the GUI screen with the camera 17a (S22). The controller 11 may capture the GUI screen using a screen capture capability.

When no image identical to the captured GUI screen is stored (NO in S24), the controller 11 performs the processing in S25 and S26 to identify the layout position of each object recognized in the GUI screen (S62).

In this step, the controller 11 calculates, based on the captured GUI screen image data, the coordinates of the upper left pixel and the lower right pixel in the area of each object in the display area of the GUI screen. The controller 11 then registers each object into the screen transition DB 12b (S27). In the present embodiment, the controller 11 stores the object name and the layout position of each object into the screen transition DB 12b in association with the name of the pre-transition GUI screen.

When determining that no screen identical to the captured GUI screen is stored (NO in S24), the controller 11 may perform the processing described below. The controller 11 calculates the match rate (similarity) between the captured GUI screen and the GUI screen registered in the screen transition DB 12b as the pre-transition screen. When the calculated match rate is greater than or equal to a predetermined value, the controller 11 determines that the GUI screen has the same function as the registered GUI screen. In S25, the current GUI screen may be registered into the screen transition DB 12b with information indicating that the current GUI screen has the same function as the registered GUI screen.

For example, when the target program is a program for a navigation system, the navigation function and the audio function may be designed with, for example, different background colors and different icon color themes. In addition to the background color, the shape and the color of the icons may also be different. When the target program is a multi-function-machine control program, the printer function and the copy function may be designed with different background colors and different icon color themes.

In such a target program, the functions included in the target program may be broadly divided. The GUI screens may be grouped by the functions to perform verification for each group subsequently. For example, objects A, B, and C in the home screen shown in FIGS. 7A and 7B can be grouped as below. The screen that appears in response to an operation on object A or object B is a screen for a function α (actually, a navigation function), and the screen that appears in response to an operation on object C is a screen for a function β (actually, an audio function). This allows function-specific verification, such as verifying the function β with priority for later verification.

After the processing in S29, the controller 11 in the present embodiment drives the robotic arm 18b based on the layout position of the identified object (S63) and causes the finger part 18a to operate the identified object on the GUI screen being displayed on the operation display 15b (S31).

In this step, the controller 11 obtains the layout position of the identified object from the screen transition DB 12b, causes the robotic arm drive 18 to drive the robotic arm 18b based on the layout position of the object, and moves the finger part 18a to a position facing the object in the GUI screen displayed on the operation display 15b. The controller 11 further causes the robotic arm drive 18 to drive the robotic arm 18b to perform a tap operation with the finger part 18a on the object in the GUI screen.

When the GUI screen displayed on the capturing display 15a and the GUI screen displayed on the operation display 15b have different sizes, the layout position of the object calculated from the captured GUI screen may be converted to the layout position of the object in the GUI screen displayed on the operation display 15b based on the ratio of the screen size. This allows an operation to be performed on the same object in the GUI screen being displayed on the operation display 15*b* as the object in the captured GUI screen.

The controller 11 generates the GUI screen to be displayed next in response to an operation on an object in the GUI screen and causes the displays 15*a* and 15*b* to display the GUI screen (S64). The controller 11 then captures the GUI screen displayed on the capturing display 15*a* (S32) and stores the captured GUI screen into the screen transition DB 12*b* as the post-transition screen in association with the pre-transition GUI screen and the operated object (S33).

When determining that the lower level GUI screen that appears next to the current GUI screen includes an object with 0 operation counts (YES in S34), the controller 11 drives the robotic arm 18*b* based on the layout position of the object for causing transition to the post-transition GUI screen (S65) and causes the finger part 18*a* to perform a tap operation on the object in the GUI screen being displayed on the operation display 15*b* to cause transition to the post-transition GUI screen (S35).

In this step as well, the controller 11 obtains the layout position of the object causing transition to the post-transition GUI screen from the screen transition DB 12*b*, drives the robotic arm 18*b* based on the layout position of the object, and moves the finger part 18*a* to the position facing the object in the GUI screen being displayed on the operation display 15*b*. The controller 11 further causes the finger part 18*a* to perform a tap operation on the object. This allows an operation to be performed on any object in the current GUI screen to cause transition to any GUI screen.

When determining that the current GUI screen has a pre-transition GUI screen (YES in S36), the controller 11 drives the robotic arm 18*b* based on the layout position of the return object (S66) and causes the finger part 18*a* to perform a tap operation on the return object in the GUI screen being displayed on the operation display 15*b* to cause transition to the pre-transition GUI screen (S37).

In this step as well, the controller 11 obtains the layout position of the return object from the screen transition DB 12*b*, drives the robotic arm 18*b* based on the layout position of the return object, and moves the finger part 18*a* to a position facing the return object in the GUI screen being displayed on the operation display 15*b*. The controller 11 further causes the finger part 18*a* to perform a tap operation on the return object. This allows an operation to be performed on the return object in the current GUI screen to cause return to the pre-transition GUI screen before the current GUI screen.

When the processing instructions associated with the objects in a GUI screen are unknown, the above process allows physical operations on objects in actually displayed GUI screens to allow the processing of the target program performed in response to the operation on each object to be performed.

For a GUI program for a device using an OS with, for example, the processing instructions associated with objects unpublished, the screen transition DB 12*b* can thus be generated automatically through execution of the GUI program.

In the present embodiment, a tap operation is performed with the finger part 18*a* on the objects in the GUI screen. In some embodiments, objects may be operated in any different manners, and different operations may be performed on different objects. For example, operations to be performed on the respective objects may be registered in association with the objects. When operating each object, the controller 11 can identify the type of operation and cause the robotic arm 18*b* to perform the operation corresponding to the identified operation to perform the corresponding operation on each object.

The information processing device 10 in the present embodiment can generate, through the process described above, a true screen transition DB 12*b* based on, for example, the first released target program and can generate a post-update screen transition DB 12*b* based on the latest target program. The information processing device 10 in the present embodiment can perform the process shown FIG. 9 and can verify the operation of the latest target program based on the true screen transition DB 12*b* and the post-update screen transition DB 12*b*.

In the present embodiment, the capturing display 15*a* and the operation display 15*b* are separate from each other. In some embodiments, the displays may be one display 15. More specifically, the GUI screen displayed on the display 15 may be captured with the camera 17*a* and operated by the finger part 18*a*.

Third Embodiment

In the first and second embodiments described above, the verification result (positive or negative) is determined based on the result of comparison with the true screen transition data (post-transition GUI screen).

In the present embodiment described below, an information processing device determines the verification result based on the output state of a sound signal in addition to the state of the post-transition GUI screen. In the present embodiment, although the post-transition GUI screen matches the true screen (the similarity is greater than or equal to the threshold), the verification result is determined to be negative unless the output state of the sound signal before and after the screen transition is the true state.

An information processing device 10 in the present embodiment includes the same components as the information processing device 10 in the first embodiment shown in FIG. 1, and such components are not described.

Figures 15, 16:
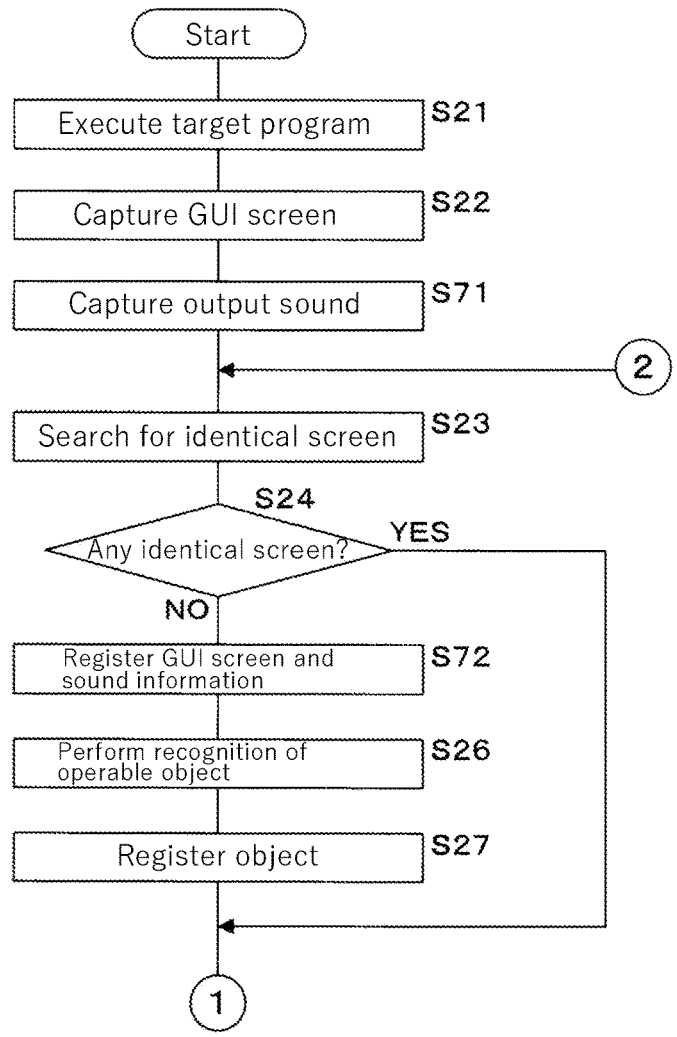
FIG. 15 is a diagram of a screen transition DB in a third embodiment with an example record layout.
FIG. 16 is a flowchart of an example procedure for generating the screen transition DB in the third embodiment.

FIG. 15 is a diagram of a screen transition DB 12*b* in a third embodiment with an example record layout. The screen transition DB 12*b* in the present embodiment includes, in addition to the columns in the screen transition DB 12*b* in the first embodiment shown in FIG. 2B, a sound information column storing information indicating the output state of the sound signal on the pre-transition GUI screen and a sound information column storing information indicating the output state of the sound signal on the post-transition GUI screen. Sound information includes, for example, information about the presence of an output sound, volume, and the time length from when a screen has transitioned to when a sound signal is output.

Figure 17:
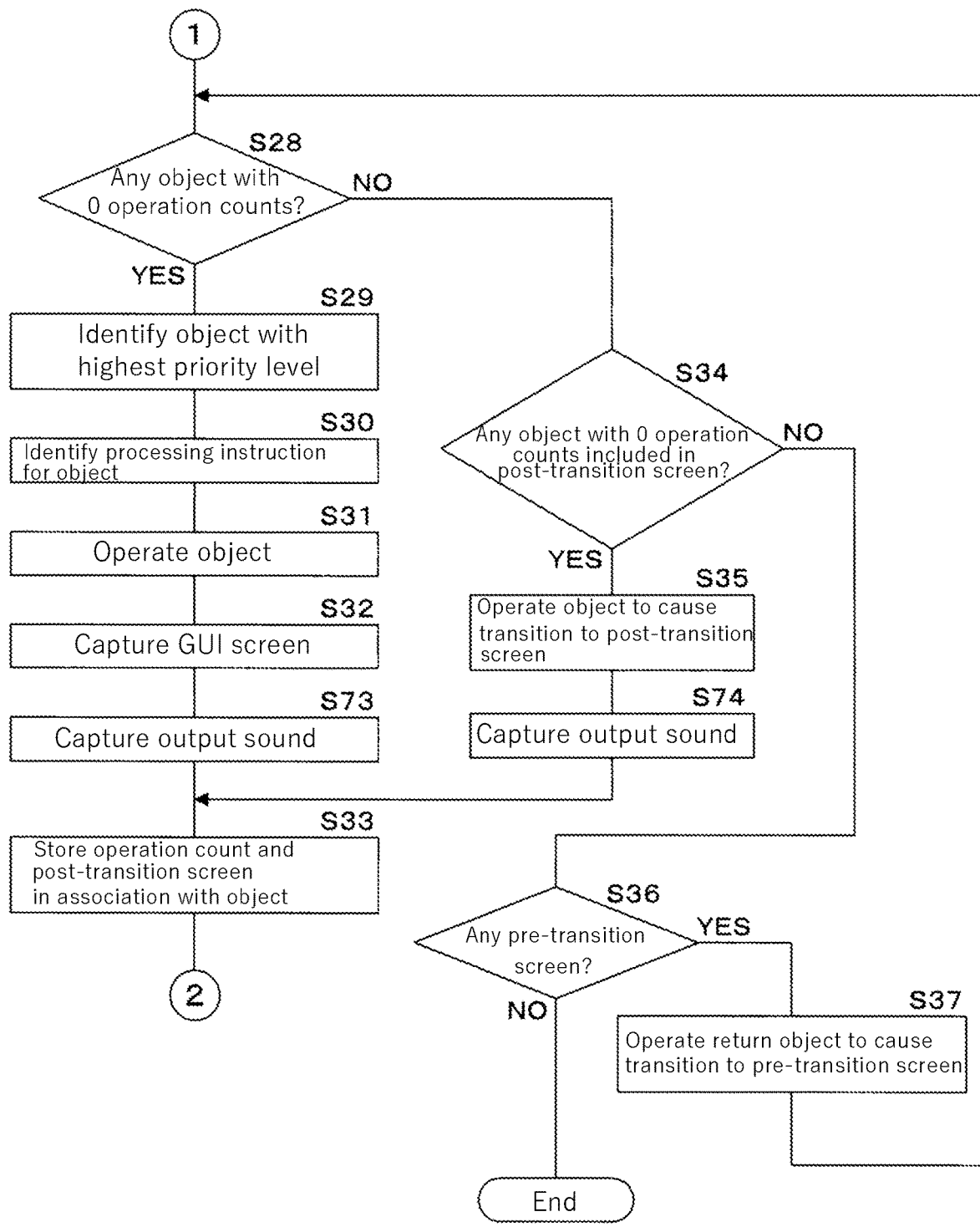
FIG. 17 is a flowchart of an example procedure for generating the screen transition DB in the third embodiment.

FIGS. 16 and 17 are each a flowchart of an example procedure for generating the screen transition DB 12*b* in the third embodiment. The process shown in FIGS. 16 and 17 is modified from the process shown in FIGS. 5 and 6, with S71 added between S22 and S23, S25 replacing S72, S73 added between S32 and S33, and S74 added after S35. The same processing as in FIGS. 5 and 6 is not described.

In the information processing device 10 in the present embodiment, the controller 11 executes the target program (S21) upon activation of the transition generation program P1, and captures the GUI screen to be displayed by execution of the target program (S22). The controller 11 also captures the sound to be output to obtain sound information (S71).

For example, the controller 11 obtains information about the presence of an output sound and its volume. The controller 11 may obtain the type of sound, such as whether the output sound is voice or music. For voice, the controller 11 may obtain the specific output information by voice recognition. The controller 11 may record the output sound to obtain recording data.

When determining that no screen identical to the captured GUI screen (current GUI screen) is stored (NO in S24), the controller 11 registers the current GUI screen into the screen transition DB 12b as a pre-transition screen together with sound information (S72). This allows, in addition to the registration of the GUI screen to be displayed by execution of the target program, registration of sound information indicating the state of the sound output during the display of the GUI screen.

The controller 11 captures the GUI screen to be displayed in response to an operation on the object identified in S29 (S32) and captures the output sound to obtain sound information (S73). The controller 11 then stores, together with the sound information, the current GUI screen into the screen transition DB 12b as a post-transition screen in association with the pre-transition GUI screen, the operated object, and the operation count of the object (S33).

When determining that the lower level GUI screen that appears next to the current GUI screen includes an object with 0 operation counts (YES in S34), the controller 11 causes transition to the post-transition GUI screen (S35) and captures the output sound on the post-transition GUI screen to obtain sound information (S74).

In this case as well, the controller 11 stores, together with the sound information, the current GUI screen into the screen transition DB 12b as a post-transition screen in association with the pre-transition GUI screen, the operated object, and the operation count of the object (S33).

The output sound is captured at the same time as the current GUI screen through the process described above. This allows capturing of the transition state of the output sound as well as the screen transition caused by an operation on an object.

The information processing device 10 in the present embodiment can generate, through the process described above, a true screen transition DB 12b based on, for example, the first released target program and can generate a post-update screen transition DB 12b based on the latest target program. The information processing device 10 in the present embodiment can perform the process shown FIG. 9 and can verify the operation of the latest target program based on the true screen transition DB 12b and the post-update screen transition DB 12b.

In the present embodiment, the process in FIGS. 16 and 17 is performed in S42 of the process in FIG. 9. The screen transition data read in S43 includes information about the sound output during the display of the pre-transition GUI screen and the information about the sound output during the display of the post-transition GUI screen.

In the process in FIG. 9, the controller 11 in the present embodiment reads, together with the true post-transition GUI screen, the sound information (true sound information) output during the display of the GUI screen in S44. In S45, the controller 11 then compares the post-transition GUI screen and the sound information included in the screen transition data read in S43 with the true post-transition GUI screen and sound information and determines the verification result. For example, the controller 11 determines whether the two pieces of sound information being compared match in the presence of output sound. When the output sound is present, the controller 11 determines whether the volumes match (the difference in volume is less than a threshold).

When the two pieces of the sound information being compared both indicate no presence of output sound, the controller 11 determines that the sound information after the transition is the true sound information (verification result being positive). When one of the two pieces of sound information indicates the presence of output sound and the other indicates no presence of output sound, the controller 11 determines that the sound information after the transition is not the true sound information (verification result being negative).

When both pieces of sound information being compared indicate the presence of output sound, the controller 11 compares the volumes in the two pieces of sound information being compared. When the volumes match, the controller 11 determines that the sound information after the transition is the true sound information (verification result being positive). When the volumes do not match, the controller 11 determines that the sound information after the transition is not the true sound information (verification result being negative).

For pieces of sound information being compared including specific output information, the controller 11 may determine the verification result based on whether the pieces of specific output information in the compared sound information match. For example, when the pieces of specific output information in the sound information being compared include the same keyword, the controller 11 may determine that the sound information after the transition is the true sound information (verification result being positive). When the keywords in the pieces of specific output information differ, the controller 11 may determine that the sound information after the transition is not the true sound information (verification result being negative).

The process described above in the present embodiment can verify, as the verification result being negative, a no-sound state in which the sound to be output is not output. This allows determination of the verification result being negative when the output sound information does not match the true sound information, although the post-transition GUI screen matches the true screen (the similarity is greater than or equal to a threshold). The process described above verifies the appropriateness of the transition state resulting from execution of the target program based on the sound output state as well as the transition state of the GUI screen, thus achieving more accurate operation verification.

In the first to third embodiments described above, screen transition data is generated through operations on operable objects in the current GUI screen. Each object is assigned with a priority level. The objects are operated in order of the priority to generate screen transition data efficiently.

In some embodiments, for example, an operation condition may be set for each object. When the operation condition is satisfied, each object may be operated to generate screen transition data. The operation condition for each object may include, for example, simultaneous operations on multiple objects and prohibition of operation for a predetermined time after displaying of a GUI screen. Setting such conditions allows appropriate control of the range (verification range) of GUI screens for which screen transition data is generated. Thus, in the operation verification for GUI programs with complex screen configurations, screen transition data can be efficiently generated in order of priority from the GUI screen with the highest priority level, accelerating operation verification with improved efficiency.

Figures 18A, 18B:
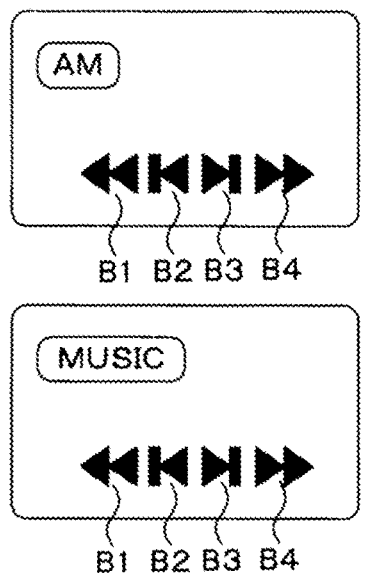
FIGS. 18A and 18B are diagrams of an object DB in a modification.

FIGS. 18A and 18B are diagrams of an object DB 12*a* in a modification. Objects displayed in a GUI screen may be assigned with different processing instructions as appropriate for the type of GUI screen (type of function). FIG. 18B shows an example GUI screen appearing during listening to amplitude modulation (AM) radio and an example screen appearing during playing of music with a CD, an SD card, or other recording media. The GUI screen appearing during listening to AM radio and the GUI screen appearing during playing of music have the same configuration, with objects B1 to B4 as operable buttons.

However, for example, object B3 is assigned with the tune-up processing instruction (process of increasing the channel frequency to search for listenable channels) in the AM radio GUI screen and the truck-up processing instruction (process of playing the next pieces of music) in the music playing GUI screen. Upon detecting an object in the GUI screen, the controller 11 can thus distinguish the type of GUI screen and identify the processing instruction corresponding to the distinguished type to appropriately identify the processing instruction associated with the object in each GUI screen. The type of GUI screen may be distinguished based on, for example, a keyword in the GUI screen extracted by OCR or with other techniques.

When using the object DB 12*a* in FIG. 18A, the controller 11 extracts a keyword contained in the current GUI screen in, for example, S30 in FIG. 6. The controller 11 can identify, from the object DB 12*a*, the processing instruction associated with each object in the GUI screen containing the keyword based on the extracted keyword and the object name. This structure allows the function assigned to each object to be switched for each GUI screen. Thus, multiple processing instructions can be assigned to one object, with fewer types of object used to increase the operability of GUI screens.

Fourth Embodiment

In the first to third embodiments described above, when determining that either the target program or the execution environment has been updated, the controller 11 generates a screen transition DB 12*b* for the updated target program and compares the screen transition DB 12*b* with the pre-generated true screen transition DB 12*b* to determine whether any error is included in the screen transition data in the post-update screen transition DB 12*b*.

In the present embodiment, the controller 11 compares pre-update screen transition data, which is the screen transition data generated before the target program or the execution environment is updated, with post-update screen transition data, which is the screen transition data generated after the target program or the execution environment is updated. When the GUI screen has any difference in transition, such a difference is displayed on a transition diagram based on the pre-update transition data or a screen transition diagram based on the post-update image transition data in a manner different from the manner in which normal transition is displayed. This process will be described.

Figure 19:
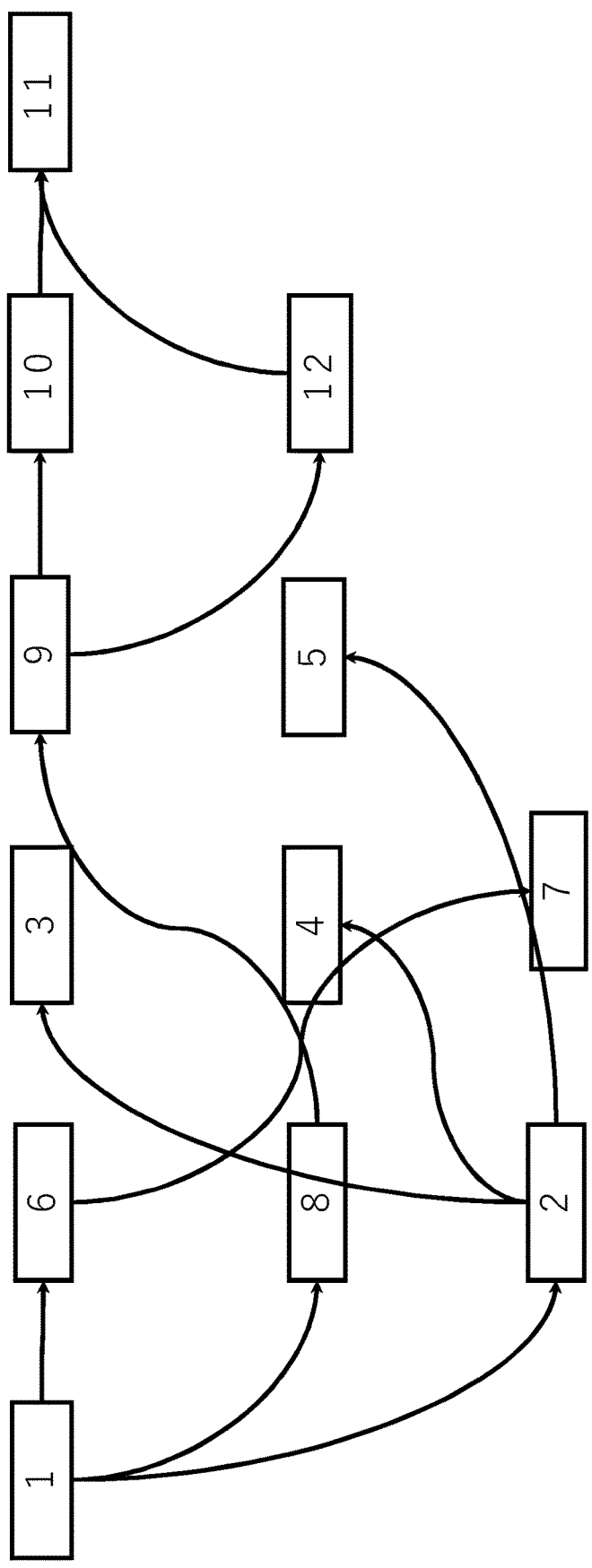
FIG. 19 is a diagram describing example transition before an update in a fourth embodiment.

FIG. 19 is a diagram describing example transition based on the pre-update screen transition data. The transition diagram is displayed on the display 15 in the information processing device 10. In this figure, the rectangle in the upper left indicates the first GUI screen at the start of a test. The number in each rectangle indicates the order of transition. Although not shown, each rectangle may display a thumbnail image of the GUI screen. The arrows connecting the rectangles indicate transitions between GUI screens, such as a transition from the GUI screen indicated by rectangle 1 to the GUI screen indicated by rectangle 2.

In the transition diagram shown in FIG. 19, the GUI screen indicated by rectangle 1 includes objects that allow transition to the GUI screens indicated by rectangle 2, rectangle 6, and rectangle 8. The arrows indicate that selecting each object included in the GUI screen indicated by rectangle 1 allows transition from rectangle 1 to rectangle 2, to rectangle 6, or to rectangle 8.

In the transition diagram shown in FIG. 19, the GUI screen indicated by rectangle 3 includes no object that allows transition to other screens. The controller 11 thus returns to the GUI screen indicated by rectangle 2, selects another object, and transitions to the GUI screen indicated by rectangle 4. The transition to the GUI screen indicated by rectangle 5 completes all transitions from the GUI screen indicated by rectangle 2. The controller 11 returns to the GUI screen indicated by rectangle 1 to select an object that allow transition to the GUI screen indicated by rectangle 6. The controller 11 repeats such processing to generate the pre-update screen transition data.

The determination as to whether the transition is transition to a new GUI screen or to a GUI screen already captured is determined based on whether the degree of similarity between the new GUI screen and the captured GUI screen is less than a predetermined value.

Figure 20:
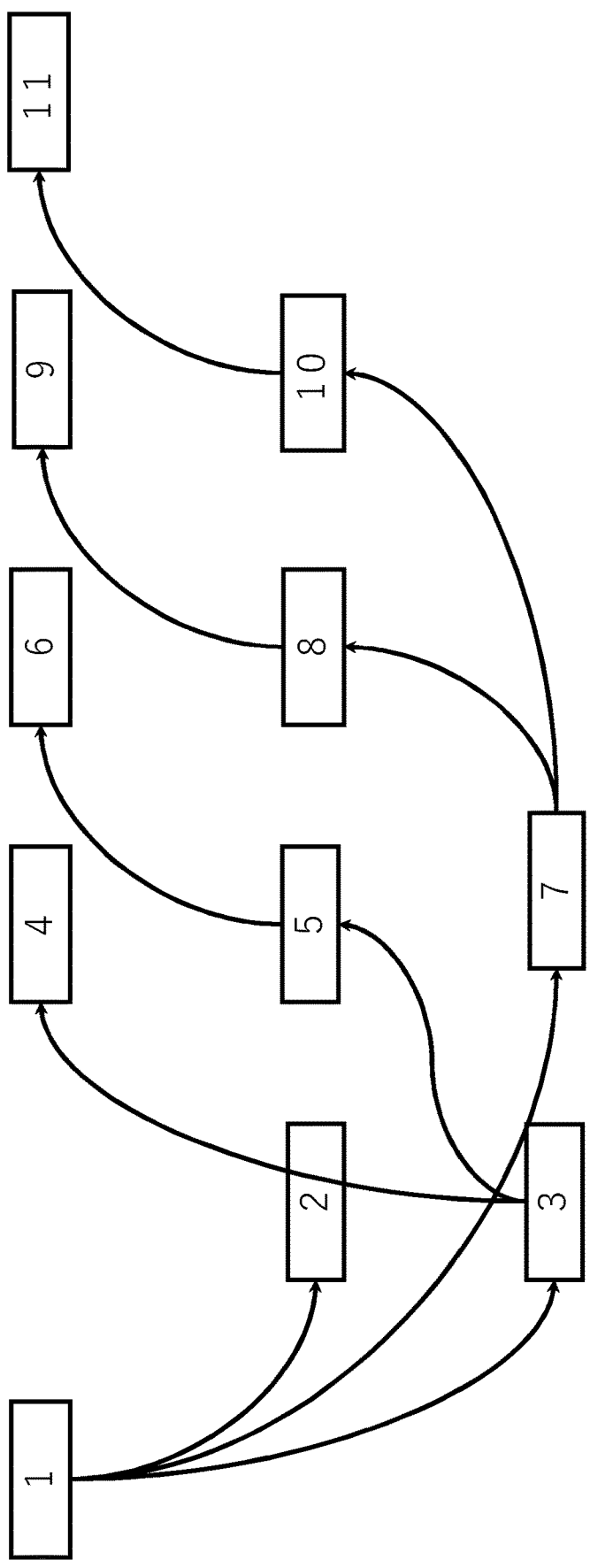
FIG. 20 is a diagram describing example transition after the update in the fourth embodiment.
Figure 21:
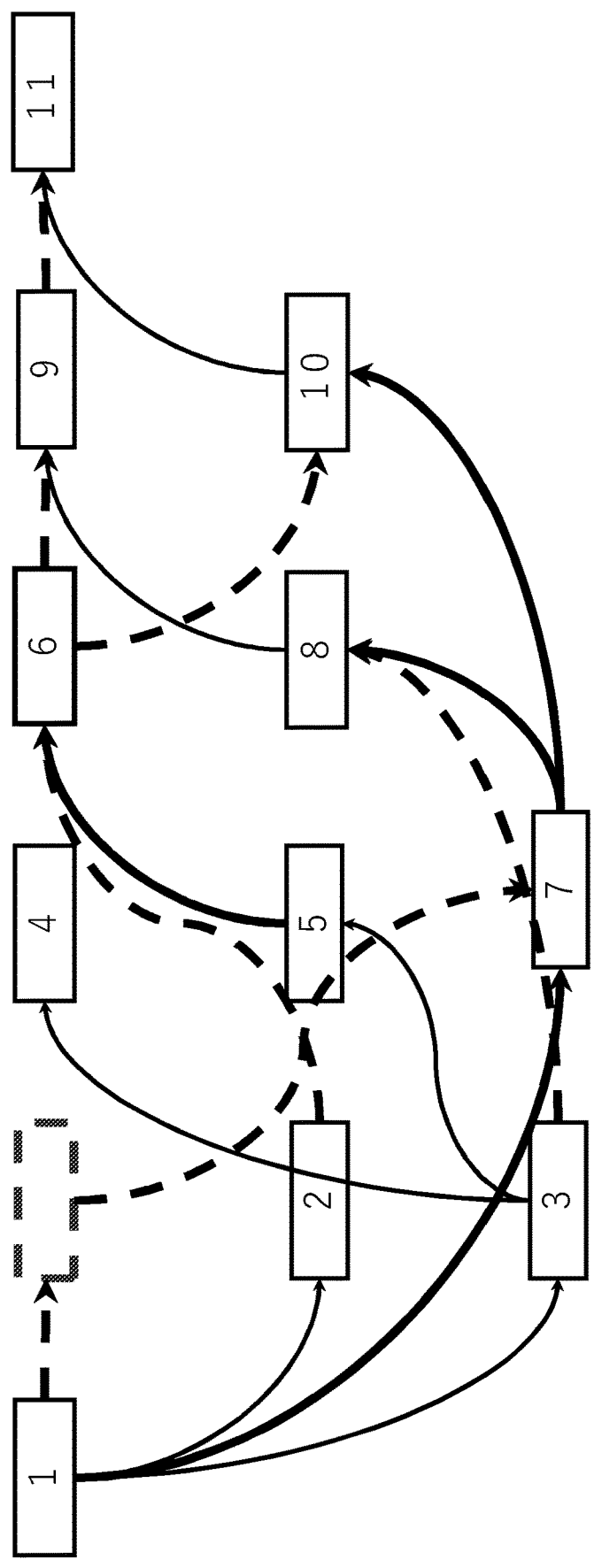
FIG. 21 is a diagram describing the transition after the update in the fourth embodiment, with differences being displayed.

FIG. 20 is a diagram describing example transition based on the post-update screen transition data. FIG. 21 is a diagram describing the transition based on the post-update image transition data, with differences from the pre-update image transition data being displayed. The diagrams are both displayed on the display 15. The rectangles and arrows shown in the transition diagram in FIG. 21 is as described with reference to the transition diagram in FIG. 19, and thus the display of differences alone is described. The dashed arrows and rectangles indicate transitions and GUI screens included in the pre-update transition diagram but not included in the post-update transition diagram. The bold arrows indicate transitions not included in the pre-update transition diagram but included in the post-update transition diagram.

As shown in FIG. 21, the differences between before and after the update displayed in the transition diagram allows the person in charge of the verification to review the differences in the screen transition, thus allowing the test to be performed with a more efficient test scenario focusing on the differences.

Although FIG. 21 shows example display of differences from the pre-update image transition data in the transition diagram based on the post-update image transition data, differences from the post-update image transition data may be displayed on the transition diagram based on the pre-update image transition data.

The features described in the embodiments can be combined with one another. The independent claims and the dependent claims in the appended claims may be combined with one another in any manner, irrespective of their dependencies. The claims include claims referring to two or more other claims (multiple dependent claims), but may include claims referring to other claims in other manners. The claims may include multiple dependent claims referring to at least one multiple dependent claim (multiple-multiple dependent claim).

The embodiments described herein are examples in all respects and should be considered not restrictive. The scope of the invention is defined not by the embodiments but by the claims, and is intended to include all changes within the meaning and scope equivalent to the claims.

REFERENCE SIGNS LIST 10 information processing device
11 controller
12 storage
13 communicator
14 input device
15 display
17 camera connection
18 robotic arm drive
M trained model
12a object DB
12b screen transition DB

The invention claimed is:

1. A non-transitory computer readable storage medium storing a program for causing a computer to perform operations comprising:
   executing a target program to cause displaying of a graphical user interface screen;
   detecting an object being operable and included in the graphical user interface screen displayed by execution of the target program, using a trained model being trained to output, in response to an input of an image of a graphical user interface screen, information about an object included in the graphical user interface screen, wherein the trained model is generated using training data including an image of a graphical user interface screen and information about an object included in the graphical user interface screen, in which different designs associated with a same processing instruction are trained to be recognized as a same type of an object;
   obtaining data about transition of a screen, wherein the transition of the screen is to be displayed in response to an operation on the detected object; and
   generating screen transition data for the target program by associating the graphical user interface screen before transition, a type of the object in the graphical user interface screen, and the data about transition of the screen to be displayed in response to the operation on the object with one another,
   wherein:
   the object is assigned with a priority level;
   the storage medium storing the program further causes the computer to perform operations comprising generating, upon detecting a plurality of objects in the graphical user interface screen, screen transition data by obtaining, in order of priority from an object with a highest priority level, data about transition of the screen to be displayed in response to an operation on each of the plurality of objects;
   the graphical user interface screen has a plurality of hierarchical levels; and
   the priority level is assigned to each of the plurality of objects based on whether screen transition data for a screen is generated by causing transition of the screen in a depth direction of the plurality of hierarchical levels of the graphical user interface screen or by causing transition to a screen at a same depth in the plurality of hierarchical levels for each depth of the plurality of hierarchical levels.

2. The storage medium storing the program according to claim 1, causing the computer to perform operations further comprising:
   comparing pre-update image transition data being the screen transition data generated before the target program or an execution environment of the target program is updated with post-update image transition data being the screen transition data generated after the target program or the execution environment of the target program is updated; and
   displaying, if the graphical user interface screen has a difference in transition, the difference on a screen transition diagram based on the pre-update image transition data or on a screen transition diagram based on the post-update image transition data in a manner different from a manner in which normal transition is displayed.

3. The storage medium storing the program according to claim 2, wherein
   comparing the pre-update image transition data with the post-update image transition data includes calculating a degree of similarity between the graphical user interface screen included in the pre-update image transition data and a corresponding graphical user interface screen included in the post-update image transition data, and determining whether the calculated degree of similarity is less than a predetermined value, and
   displaying the difference includes displaying, if the calculated degree of similarity is less than the predetermined value to indicate that the graphical user interface screen has the difference, the graphical user interface screen in a manner different from a manner in which a graphical user interface screen with no difference is displayed on the screen transition diagram.

4. The storage medium storing the program according to claim 2, wherein
   comparing the pre-update image transition data with the post-update image transition data includes calculating a degree of similarity between a sound signal output on the graphical user interface screen included in the pre-update image transition data and a sound signal output on a corresponding graphical user interface screen included in the post-update image transition data, and determining whether the calculated degree of similarity is less than a predetermined value, and
   displaying the difference includes displaying, if the calculated degree of similarity is less than the predetermined value to indicate that the graphical user interface screen has the difference, the graphical user interface screen in a manner different from a manner in which a graphical user interface screen with no difference is displayed on the screen transition diagram.

5. An information processing method implementable with a computer, the method comprising:
   executing a target program to cause displaying of a graphical user interface screen;
   detecting an object being operable and included in the graphical user interface screen displayed by execution of the target program, using a trained model being trained to output, in response to an input of an image of a graphical user interface screen, information about an object included in the graphical user interface screen, wherein the trained model is generated using training data including an image of a graphical user interface screen and information about an object included in the graphical user interface screen, in which different designs associated with a same processing instruction are trained to be recognized as a same type of an object;

obtaining data about transition of a screen, wherein the transition of the screen is to be displayed in response to an operation on the detected object; and generating screen transition data for the target program by associating the graphical user interface screen before transition, a type of the object in the graphical user interface screen, and the data about transition of the screen to be displayed in response to the operation on the object with one another, wherein:

the object is assigned with a priority level;

the storage medium storing the program further causes the computer to perform operations comprising generating, upon detecting a plurality of objects in the graphical user interface screen, screen transition data by obtaining, in order of priority from an object with a highest priority level, data about transition of the screen to be displayed in response to an operation on each of the plurality of objects;

the graphical user interface screen has a plurality of hierarchical levels; and the priority level is assigned to each of the plurality of objects based on whether screen transition data for a screen is generated by causing transition of the screen in a depth direction of the plurality of hierarchical levels of the graphical user interface screen or by causing transition to a screen at a same depth in the plurality of hierarchical levels for each depth of the plurality of hierarchical levels.

6. The information processing method implementable with the computer according to claim 5, further comprising:

identifying data about transition of the screen associated with the graphical user interface screen before transition and the type of the object from the screen transition data generated before the target program or the execution environment of the target program is updated;

comparing the obtained data about transition of the screen with the identified data about transition of the screen; and outputting a result of comparison.

7. The information processing method implementable with the computer according to claim 6, further comprising:

calculating a degree of similarity between the obtained data about transition of the screen and the identified data about transition of the screen; and outputting the graphical user interface screen before transition and the type of the object if the calculated degree of similarity is less than a predetermined value.

8. The information processing method implementable with the computer according to claim 6, further comprising:

comparing pre-update image transition data being the screen transition data generated before the target program or an execution environment of the target program is updated with post-update image transition data being the screen transition data generated after the target program or the execution environment of the target program is updated; and displaying, if the graphical user interface screen has a difference in transition, the difference on a screen transition diagram based on the pre-update image transition data or on a screen transition diagram based on the post-update image transition data in a manner different from a manner in which normal transition is displayed.

9. The information processing method implementable with the computer according to claim 8, wherein comparing the pre-update image transition data with the post-update image transition data includes calculating a degree of similarity between the graphical user interface screen included in the pre-update image transition data and a corresponding graphical user interface screen included in the post-update image transition data, and determining whether the calculated degree of similarity is less than a predetermined value, and displaying the difference includes displaying, if the calculated degree of similarity is less than the predetermined value to indicate that the graphical user interface screen has the difference, the graphical user interface screen in a manner different from a manner in which a graphical user interface screen with no difference is displayed on the screen transition diagram.

10. The information processing method implementable with the computer according to claim 6, further comprising:

comparing the pre-update image transition data with the post-update image transition data includes calculating a degree of similarity between a sound signal output on the graphical user interface screen included in the pre-update image transition data and a sound signal output on a corresponding graphical user interface screen included in the post-update image transition data, and determining whether the calculated degree of similarity is less than a predetermined value, and displaying the difference includes displaying, if the calculated degree of similarity is less than the predetermined value to indicate that the graphical user interface screen has the difference, the graphical user interface screen in a manner different from a manner in which a graphical user interface screen with no difference is displayed on the screen transition diagram.

11. A non-transitory computer readable storage medium storing a program for causing a computer to perform operations comprising:

executing a target program to cause displaying of a graphical user interface screen;

detecting an object being operable and included in the graphical user interface screen displayed by execution of the target program, using a trained model being trained to output, in response to an input of an image of a graphical user interface screen, information about an object included in the graphical user interface screen, wherein the trained model is generated using training data including an image of a graphical user interface screen and information about an object included in the graphical user interface screen, in which different designs associated with a same processing instruction are trained to be recognized as a same type of an object;

obtaining data about transition of a screen, wherein the transition of the screen is to be displayed in response to an operation on the detected object;

identifying data about transition of the screen associated with the graphical user interface screen before transition and a type of the object from the screen transition data generated before the target program or the execution environment of the target program is updated;

comparing the obtained data about transition of the screen with the identified data about transition of the screen; and outputting a result of comparison, wherein the operations further comprises:

calculating a degree of similarity between the obtained data about transition of the screen and the identified data about transition of the screen; and outputting the graphical user interface screen before transition and the type of the object if the calculated degree of similarity is less than a predetermined value.

* * * * *